United States Patent [19]
McMaster

[11] Patent Number: 4,470,858
[45] Date of Patent: Sep. 11, 1984

[54] LAMINATION PROCESS AND APPARATUS

[75] Inventor: Dexter McMaster, Perrysburg, Ohio

[73] Assignee: Deltaglass S.A., Weston, Canada

[21] Appl. No.: 446,981

[22] Filed: Dec. 6, 1982

[51] Int. Cl.³ ............................................. B32B 17/00
[52] U.S. Cl. .................................... 156/103; 156/104;
   156/267; 156/273.7; 156/275.5; 156/275.7;
   156/295; 156/312; 427/286
[58] Field of Search .................... 156/103, 273.7, 104,
   156/275.5, 267, 275.7, 295, 555, 312, 558, 357,
   578, 379.8, 582, 99; 100/155 G, 176; 118/679;
   427/286

[56] References Cited

U.S. PATENT DOCUMENTS

| | | | |
|---|---|---|---|
| 2,091,331 | 8/1937 | Owen | 156/555 |
| 2,382,956 | 8/1945 | Boicey et al. | 156/267 |
| 3,518,137 | 6/1970 | Hamilton | 156/104 |
| 3,928,114 | 12/1975 | Aylon | 156/357 |
| 4,036,673 | 7/1977 | Murphy et al. | 156/295 |
| 4,355,077 | 10/1982 | Chevreux et al. | 156/275.5 |
| 4,387,000 | 6/1983 | Tancrefi | 156/555 |

Primary Examiner—John J. Gallagher
Attorney, Agent, or Firm—Ivor M. Hughes; James Fornari

[57] ABSTRACT

Processes for the lamination of sheets of material including sheets of glass, with and without a substrate or interlayer and apparatus suitable for use in carrying out such processes.

180 Claims, 25 Drawing Figures

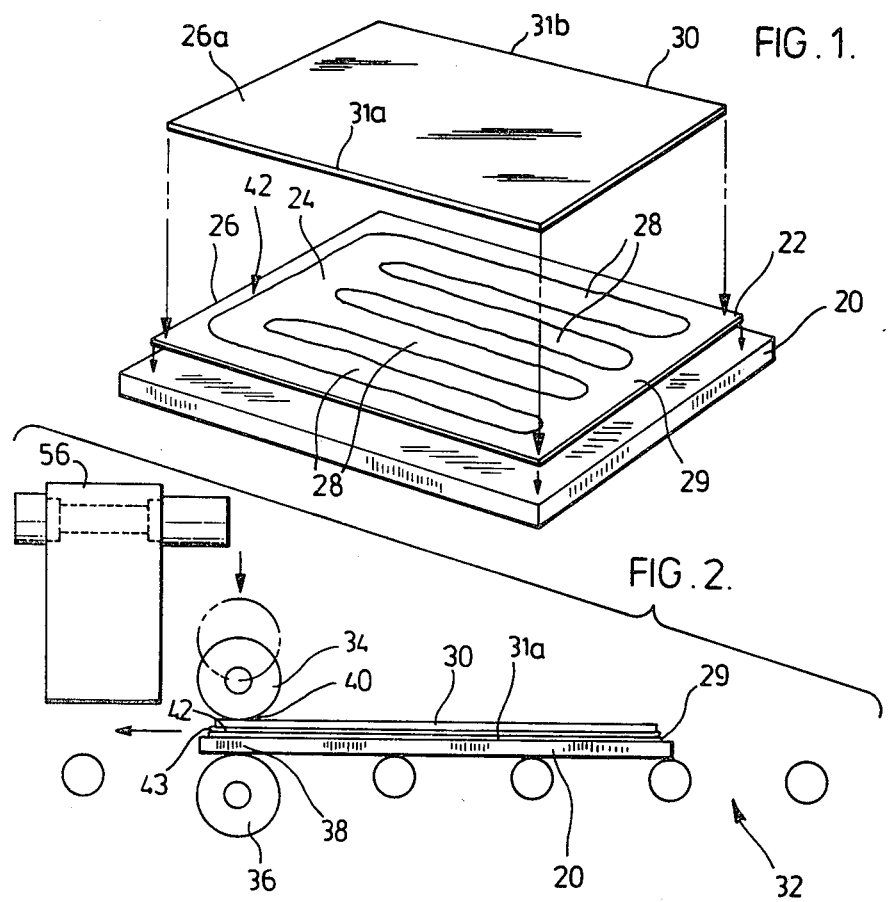
FIG. 1.
FIG. 2.
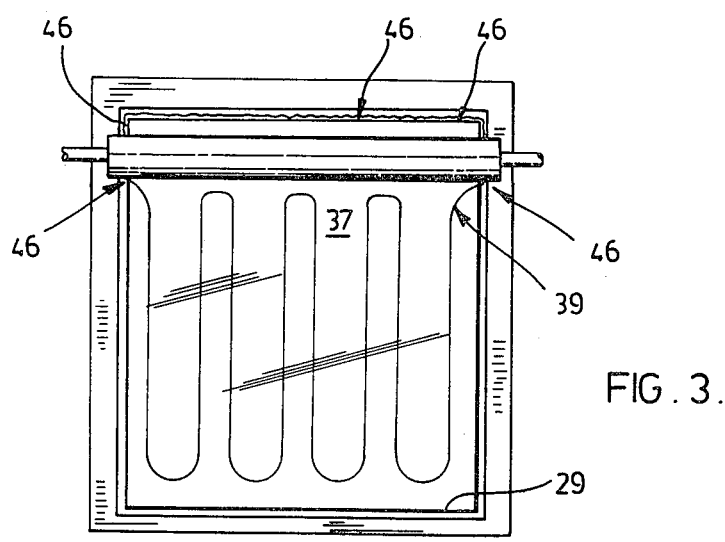
FIG. 3.

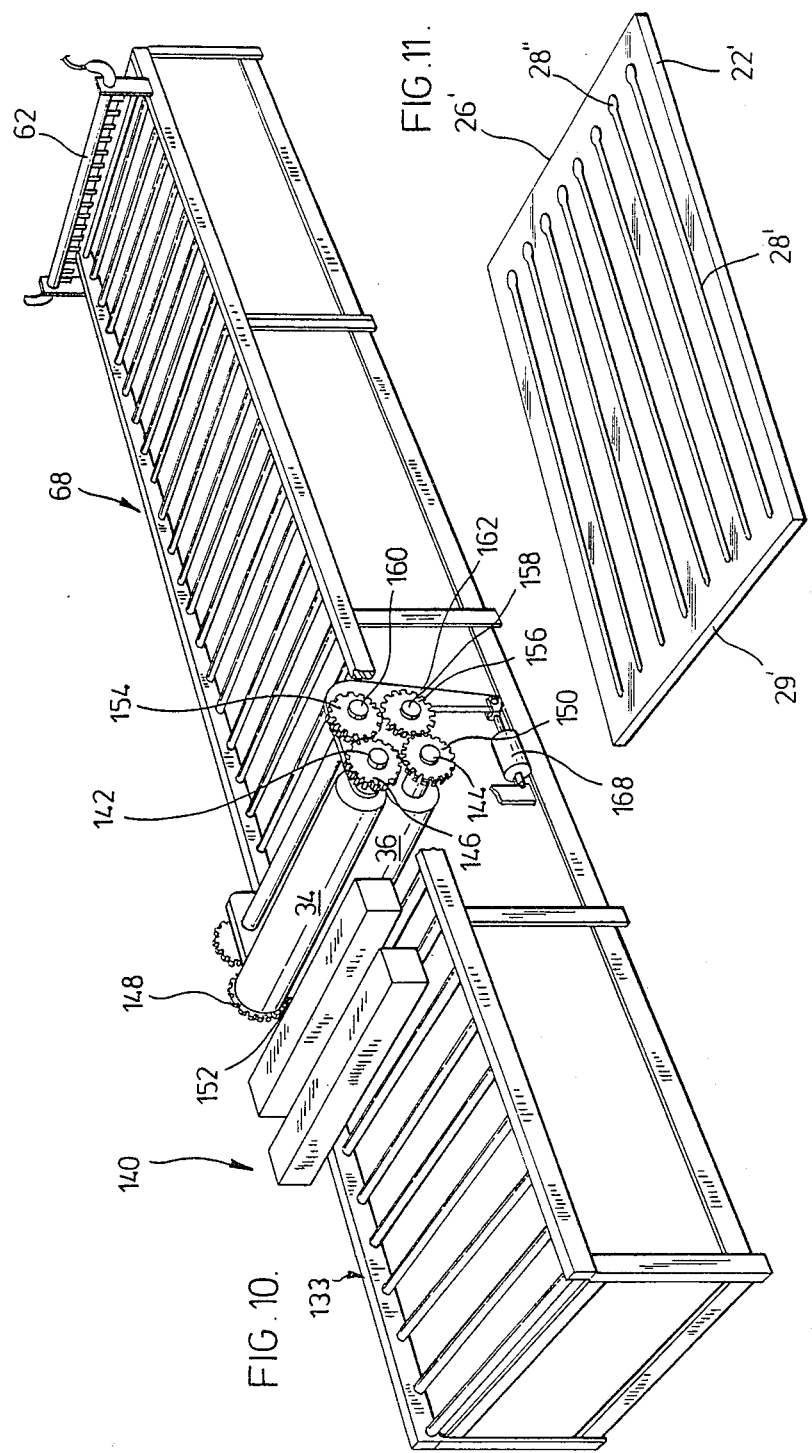

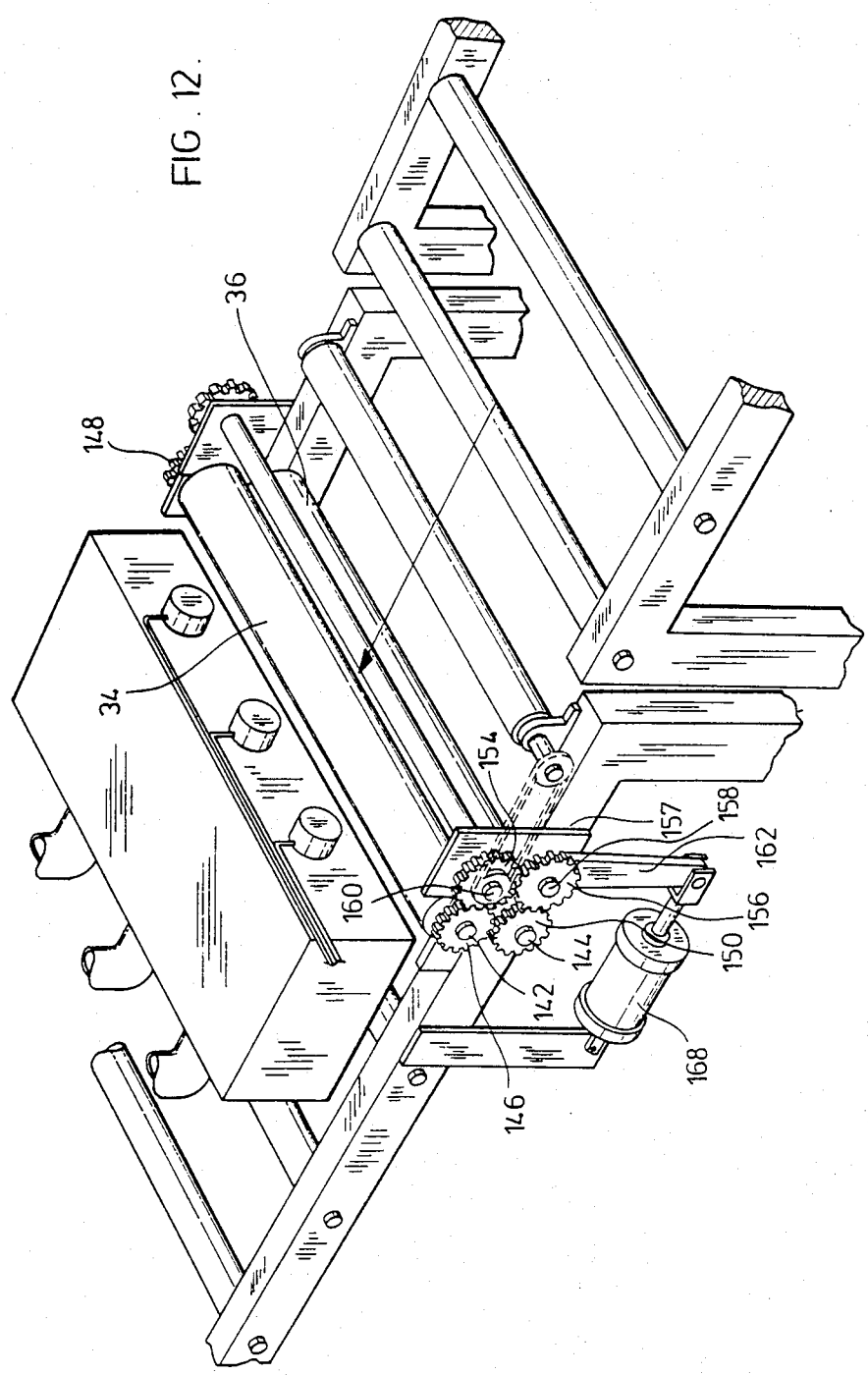

LAMINATION PROCESS AND APPARATUS

FIELD OF INVENTION

This invention relates to:
processes for the lamination of sheets of material including sheets of glass, with and without a substrate or interlayer; and
apparatus suitable for use in carrying out such processes.

BACKGROUND OF THE INVENTION

Many processes and apparatus have been proposed for the lamination of glass. These include those disclosed in U.S. Pat. Nos. 1,667,832; 2,075,726; 2,088,776; 2,831,791; 3,132,581; 3,450,032; 3,518,137 and 3,654,039 which teach (among other process steps), the use of pressure gradients to eliminate air bubbles in the heated interlayer between the sheets of glass to be laminated (See U.S. Pat. Nos. 1,667,832 and 3,518,137) and the rearward expulsion of the trapped air from between the sheets of glass to be laminated (See U.S. Pat. No. 2,088,776).

A newer and less costly approach to the manufacture of laminated glass includes the irradiation of a thermoplastic film interlayer between the glass sheets for securing the glass sheets together.

However, none of the processes proposed is carried out simply, effectively, in minimal time, and at minimum cost. For example, while U.S. Pat. No. 3,518,137 teaches the use of a pressure gradient for expressing air bubbles from between the glass sheets, the sheets of glass require double processing to eliminate a gap formed between the glass sheets proximate one of the edges of the laminated sheets of glass during initial processing.

A similar gap is left between the sheets of glass when the process of U.S. Pat. No. 2,088,776 is carried out.

In the latest processes employing irradiation of a photopolymerisable liquid adhesive composition for securing glass sheets directly to one another or indirectly to one another employing a substrate between the glass sheets, additional and other problems present themselves, as for example, the expressing of liquid adhesive composition from between the glass sheets onto parts of the apparatus used in the process.

It is therefore, an object of this invention to provide simple, cost effective processes for the lamination of sheets of material, including sheets of glass, with and without a substrate or interlayer, which processes overcome the aforementioned difficulties and which processes lend themselves to efficient mass production of among other products, laminated glass.

It is a further object of this invention to provide apparatus suitable for use in such processes.

Further and other objects of the invention will be realized by those skilled in the art from the following summary of the invention and detailed description of embodiments thereof.

SUMMARY OF THE INVENTION

According to one aspect of the invention, in a process for the joining of two sheets of material together, one of which sheets being transparent, preferably comprising at least one sheet of glass, a substrate or interlayer (for example, PVC, PVB or polyurethane), the process comprises the steps of:

(a) distributing liquid radiation curable (for example, photopolymerisable) adhesive composition on one surface of one of the sheets at least proximate one side edge across the sheet and preferably along a portion of the length of the sheet (in one embodiment comprising a plurality of ribbons of liquid adhesive spaced across the sheet, each ribbon extending along at least a portion of the length of the sheet and preferably having a greater amount of adhesive per unit length of ribbon proximate the end of the ribbon nearest the side edge, (for example, in the form of a puddle) and in another embodiment, comprising at least a ribbon of adhesive extending across the sheet proximate the side edge and a plurality of ribbons extending normal to the ribbon extending across the sheet in a direction away from the side edge at least for a portion of the length of the sheet);

(b) applying the other sheet to the adhesive covered sheet;

(c) applying pressure against each of the sheets in at least a plane substantially normal to the planes of the sheets, proximate to, and parallel to, the side edge, (in one embodiment, in a direction generally normal to the plane of the sheets and over a narrow elongate zone which extends generally parallel to the side edge and which application of pressure incorporates the plane of pressure application) to squeeze adhesive, towards the side edge filling any gap between the sheets between the position of initial pressure application and the side edge, and away from the plane (or zone) of pressure application on the side of the plane (or zone) of pressure application remote the side edge to form a continuous film of adhesive on the side of the plane (or zone) of pressure remote the side edge across the sheets between the sheets, and thereafter, while continuing to apply pressure moving the plane (or zone) of pressure relative to the sheets away from the side edge or moving the sheets relative to the plane (or zone) of pressure in the direction towards the side edge, ensuring that the edge of the film remote the plane (or zone) of pressure is always spaced from the plane (or zone) of pressure until the sheets have passed through or have been passed through the plane (or zone) of pressure, to uniformly spread the adhesive between the sheets and eliminate air bubbles; and (d) thereafter, curing the liquid adhesive composition by irradiation for curing the adhesive composition as for example, by photopolymerization of the liquid adhesive composition by irradiation.

According to another aspect of the invention, in a process for the joining of two sheets of material together, one of which sheets being transparent preferably comprising at least one sheet of glass, and a substrate or interlayer (or example, PVC, PVB or polyurethane), the process comprises the steps of:

(a) distributing liquid radiation curable (for example, photopolymerisable) adhesive composition on one surface of one of the sheets at least proximate one side edge across the sheet and preferably along a portion of the length of the sheet (in one embodiment comprising a plurality of ribbons of liquid adhesive spaced across the sheet, each ribbon extending along at least a portion of the length of the sheet and preferably having a greater amount of adhesive per unit length of ribbon proximate the end of the ribbon nearest the side edge—for example, in the form of a puddle—and in another embodiment, comprising at least a ribbon of adhesive extending across the sheet proximate the side edge and a plurality of ribbon extending normal to the ribbon extending across the sheet in a direction away from the side edge at least for a portion of the length of the sheet);

(b) applying the other sheet to the adhesive covered sheet;

(c) applying pressure against each of the sheets in at least a plane substantially normal to the planes of the sheets, proximate to, and parallel to, the side edge, (in one embodiment, in a direction generally normal to the plane of the sheets and over a narrow elongate zone which extends generally parallel to the side edge and which application of pressure incorporates the plane of pressure application) to squeeze adhesive, towards the side edge filling any gap between the sheets between the position of initial pressure application and the side edge, and away from the plane (or zone) of pressure application on the side of the plane (or zone) of pressure application remote the side edge to form a continuous film of adhesive on the side of the plane (or zone) of pressure remote the side edge, across the sheets between the sheets, and thereafter, while continuing to apply pressure in the plane, (or zone) moving the sheets relative to the plane (or zone) of pressure in the direction towards the side edge ensuring that the edge of the film remote the plane (or zone) of pressure is always spaced from the plane (or zone) of pressure until the sheets have passed through the plane (or zone) of pressure to uniformly spread adhesive between the sheets, and eliminate air bubbles; and (d) thereafter, curing the liquid adhesive composition by irradiation as for example, photopolymerization by irradiation.

According to another aspect of the invention, in a process for the manufacture of laminated glass comprising sheets of glass and a liquid radiation curable (for example, photopolymerisable) adhesive composition for bonding the glass, the process comprises the steps of:

(a) distributing the liquid radiation curable adhesive composition on one surface of one sheet of glass at least proximate one side edge across the sheet and preferably along a portion of the length of the sheet (in one embodiment comprising a plurality of ribbons of liquid adhesive spaced across the sheet, each ribbon extending along a portion of the length of the glass and preferably having a greater amount of adhesive per unit length of ribbon proximate the end of the ribbon nearest the side edge—for example, in the form of a puddle—and in another embodiment, comprising at least a ribbon of adhesive extending across the sheet proximate the side edge and a plurality of ribbons extending normal to the ribbon extending across the sheet in a direction away from the side edge at least for a portion of the length of the sheet of glass):

(b) applying the other sheet of glass to the adhesive covered sheet of glass;

(c) applying pressure against each of the sheets of glass in at least a plane plane substantially normal to the plane of the sheets of glass, proximate to, and parallel to, the side edge, (in one embodiment in a direction normal to the plane of the sheets and over a narrow elongate zone which extends generally parallel to the side edge and which application of pressure incorporates the plane of pressure application) to squeeze adhesive, towards the side edge filling any gap between the sheets of glass between the position of initial pressure application and the side edge, and away from the plane (or zone) of pressure application on the side of the plane of pressure application remote the side edge to form a continuous film of adhesive on the side of the plane (or zone) of pressure remote the side edge across the sheet of glass between the sheets of glass, and thereafter, while continuing to apply pressure in the plane (or zone) moving the sheets of glass relative to the plane of pressure in the direction towards the side edge ensuring that the edge of the film remote the plane (or zone) of pressure is always spaced from the plane (or zone) of pressure until the sheets have passed through the plane (or zone) of pressure to uniformly spread the adhesive between the sheets and eliminate air bubbles; and (d) thereafter, curing the liquid adhesive composition by irradiation as for example, by photopolymerization by irradiation.

According to another aspect of the invention, in a process for the manufacture of laminated glass comprising sheets of glass, a substrate or interlayer (for example, PVC, PVB, or Polyurethane material), and a liquid radiation curable (for example, photopolymerisable) adhesive composition for bonding the glass sheets to the substrate or interlayer, the process comprises the steps of:

(a) distributing the liquid adhesive composition on one surface of the substrate or interlayer at least proximate one side edge of the sheet, across the sheet and preferably along a portion of the length of the sheet, (in one embodiment comprising at least a ribbon of liquid adhesive extending across the sheet proximate to, and parallel to, the side edge, and a plurality of ribbons extending substantially normal to the ribbon extending across the sheet in a direction away from the side edge and in another embodiment, a plurality of ribbons of liquid adhesive extending away from the side edge, spaced across the substrate or interlayer, each ribbon extending along at least a portion of the length of the substrate or interlayer, and preferably having a greater amount of adhesive per unit length of ribbion proximate the end of the ribbon nearest the side edge—for example, in the form of a puddle);

(b) applying a sheet of glass to the surface of the substrate or interlayer carrying the adhesive composition;

(c) applying pressure against the outer surface of each of the substrate and glass sheet in at least a plane substantially normal to the planes of the substrate and sheet of glass proximate to, and parallel to, the side edge proximate which the adhesive was applied, (in one embodiment, in a direction normal to the plane of the sheets and over a narrow elongate zone which extends generally parallel to the side edge and which application of pressure incorporates the plane of pressure application) to squeeze adhesive, towards the side edge filling the gap between the substrate and sheet of glass between the position of the initial application of pressure to the substrate and glass sheet, and side edge, and away from the plane (or zone) of pressure applied on the side of the plane (or zone) of pressure application remote the side edge to form a continuous film of adhesive on the side of the plane (or zone) of pressure application remote the side edge across the sheet of glass and substrate, between the sheet of glass and substrate, and thereafter, while continuing to apply pressure in the plane (or zone), moving the combination of the substrate and glass sheet relative to the plane (or zone) of pressure in a direction towards the side edge through the plane (or zone) in which the pressure is applied ensuring that the edge of the film remote the plane (or zone) of pressure is always spaced from the plane (or zone) until the sheets have passed through the plane (or zone) of pressure to, uniformly spread the adhesive between the substrate and sheet of glass as the combination is moved through the plane (or zone) of pressure application and eliminate air bubbles; and (d) thereafter, curing the liquid adhesive composition by irradiation, as for example, by photopolymerization by irradiation.

According to another aspect of the invention, in a process for the manufacture of laminated glass comprising sheets of glass of predetermined length and width, a substrate or interlayer of predetermined length and width greater than the length and width of the glass sheets (the substrate or interlayer for example, comprising a sheet of clear transparent PVC, PVB or Polyurethane material) and a liquid radiation curable (for example, photopolymerisable) adhesive composition for bonding the glass sheets to the substrate or interlayer, the process comprises the steps of: (a) distributing liquid adhesive composition on one surface of the substrate or interlayer at least proximate one side edge of the sheet across the sheet (in one embodiment comprising at least a ribbon of liquid adhesive extending across the sheet proximate to, and parallel to, the side edge, and a plurality of ribbons extending normal to the ribbon extending across the sheet, in a direction away from the side edge, and in another embodiment, a plurality of ribbons of liquid adhesive extending away from the side edge, spaced across the substrate or interlayer, each ribbon extending along at least a portion of the length of the substrate or interlayer and preferably having a greater amount of adhesive per unit length of ribbon proximate the end of the ribbon nearest the side edge—for example, in the form of a puddle);

(b) applying a sheet of glass to the surface of the substrate or interlayer, carrying the adhesive composition with the edges of the substrate extending beyond all edges of the glass sheet;

(c) applying pressure against the outer surface of each of the substrate and glass sheet in at least a plane substantially normal to the planes of the substrate and glass sheet towards the adhesive composition, proximate to, and parallel to, the side edge of the substrate where the liquid photopolymerisable adhesive composition has been distributed, (in one embodiment in a direction normal to the plane of the sheets and over a narrow elongate zone which extends generally parallel to the side edge and which application of pressure incorporates the plane of pressure application) to squeeze adhesive composition, towards the side edge filling the gap between the glass sheet and substrate proximate that side edge and expressing liquid adhesive composition from between the substrate and glass sheet onto the substrate extending beyond the glass sheet, and away from the plane (or zone) of pressure application on the side of the plane (or zone) of pressure application remote the side edge to form a continuous film of adhesive on the side of the plane (or zone) of pressure application remote the side edge across the sheet of glass and substrate between the sheet of glass and substrate and thereafter, while continuing to apply pressure in the plane normal to the plane (or zone) of the glass sheet and substrate, moving the combination of the glass sheet and substrate relative to the plane (or zone) of pressure in the direction towards the side edge through the plane (or zone) in which the pressure was applied ensuring that the edge of the film remote the plane (or zone) of pressure application is always spaced from the plane (or zone) until the sheets have passed through the plane (or zone) of pressure to, uniformly spread the adhesive between the substrate and sheet of glass as the combination is moved through the plane (or zone) of pressure application, eliminate air bubbles and express excess adhesive onto the substrate; and (d) thereafter, curing the liquid adhesive composition by irradiation, as for example, by photopolymerization by irradiation.

To ensure that the edge of the film of adhesive on the side of the plane of pressure application remote the side edge never passes through the plane of pressure application (or the narrow elongate zone, as the case may be) towards the side edge, the applied pressure and speed at which the sheets of material are moved through the plane or narrow elongate zone are carefully controlled and adjusted relative to one another. This control is dependent upon the amount of liquid adhesive deposited on the material (for example, glass or substrate) and the pattern of such distribution.

By this method, all air bubbles in the adhesive composition will be pushed in the opposed direction from the side edge to be expressed from the rear and other sides for collection.

Where, for example, the substrate and glass sheet are disposed in a horizontal plane, the substrate is carried on a carrier and the glass sheet is placed on top of the substrate after deposition of the adhesive on the substrate. After the irradiation of the adhesive film between the glass sheet and substrate, the combination is turned over and the process steps repeated with the application of a second sheet of glass on top of the substrate to which adhesive has been applied. The second sheet when applied to the substrate, is aligned with the bottom sheet of glass.

After the second irradiation with both glass sheets now secured to the oversized sheet of substrate, the substrate is trimmed and finished. Because the adhesive expressed from between the glass sheets and substrate onto the substrate has been hardened (for example, polymerized) by irradiation, the hardened adhesive composition expressed from between the glass sheets and substrate, is effectively disposed of when the substrate is trimmed.

According to another aspect of the invention, the pressure may be applied by spaced rollers applied to the outer surfaces of the respective materials to be joined for example, the surface of the glass remote from the substrate, and the surface of the substrate remote from the glass where a sheet of glass is to be joined to a sheet of substrate.

Where the pressure is applied vertically, the spaced rollers are preferably of greater length than the width of the glass to ensure uniform application of pressure.

Where the pressure is applied horizontally by the rollers, and the substrate and glass oriented vertically, the roller surfaces where employed, engaging the substrate and glass, are preferably of less length than the width of the glass passing therebetween so that any adhesive expressed from between the glass and substrate would not be transferred to the surface of the roller in contact with the substrate and glass.

In one embodiment, the roller is about 10 mm. shorter on each side or about 20 mm. shorter than the width of the glass. In this case, the pressure on the remainder of the glass is transferred to the sides through the glass portions not engaged by the rollers.

According to another aspect of the invention, in a process for the manufacture of laminated glass comprising sheets of glass, a substrate or interlayer and a radiation curable (for example, photopolymerisable) adhesive composition for bonding the glass sheets to the substrate or interlayer the process comprises the steps of:

(a) distributing liquid adhesive composition on one of the surfaces of each of two sheets of glass proximate a side edge of each, applying substrate or interlayer material on one of the sheets of glass and sandwiching the substrate between the sheets of glass with the side edges proximate which the adhesive was applied, aligned with one another;

(b) applying pressure against the surfaces of the glass sheets remote the interlayer substantially normal to the planes of the glass sheets, proximate to, and parallel to, the side edges proximate which the adhesive was applied, to force adhesive towards the side edge filling the gap between the substrate and glass sheets between the position of the initial application of pressure and side edges, and to the side of the position of pressure application remote the side edges to form continuous films of adhesive on the side of the position of pressure application remote the side edges and extending across the sheets between the sheets, and thereafter, while continuing to apply the pressure, moving the combination of the substrate and glass sheets through the position of pressure application ensuring that the edge of each of the films remote the position of pressure application is always spaced from the position of pressure application until the sheets have entirely passed through the position of pressure application to uniformly spread the adhesive between the substrate and sheets of glass and eliminate air bubbles; and (c) thereafter, curing the liquid adhesive composition by irradiation, as for example, by photopolymerization by irradiation.

According to another aspect of the invention, the glass sheets may be placed side by side in a horizontal plane with each sheet having, an inner edge closer the other sheet and, an outer edge, and liquid adhesive is applied to the top surface of each sheet preferably proximate the outer side edge. The substrate is then applied to one of the sheets and the sheets of glass (one bearing the substrate) are pivoted about their inner edges in a vertical direction for sandwiching the substrate between the glass sheets. Thereafter, pressure is applied against the surfaces of the glass sheets remote the interlayer in a plane substantially normal to the plane of the glass sheets proximate to, and parallel to, the side edges of the glass proximate which the adhesive was applied, (in one embodiment in a direction normal to the plane of the sheets and a narrow elongate zone which extends generally parallel to the side edges and which application of pressure incorporates the plane of pressure application) to force adhesive towards the side edges filling the gap between the substrate and glass sheets between the plane (or zone) of the initial pressure application and side edges, and to the sides of the plane (or zone) of pressure application remote the side edges to form continuous films of adhesive between the substrate and glass sheets on the side of the plane (or zone) of pressure application remote the side edges and thereafter, while continuing to apply the pressure in the plane (or zone), moving the combination of the substrate and glass sheets through the plane (or zone) of pressure application ensuring that the edges of which films remote the plane (or zone) of pressure application are maintained at a position spaced from the plane (or zone) of pressure application until the sheets have passed through the plane (or zone) of pressure application to enable the adhesive composition to be spread uniformly between both sides of the substrate and sheets of glass, and express the air bubbles, and thereafter, curing the liquid adhesive composition by photopolymerization by irradiation.

In one embodiment, the combination is fed vertically through a series of pressure rollers oriented with their axes extending horizontally for spreading the adhesive.

In another embodiment, the combination is fed horizontally through a series of pressure rollers with their axes oriented in the vertical direction for spreading the adhesive.

According to another aspect of the invention, apparatus is provided suitable for use with the above processes, the apparatus comprising a pair of rollers, at least one of which is moveable towards and away from the other roller, (in one embodiment, in a vertical direction) by pivoting the at least one moveable roller about a pivot point remote the roller. Preferably, each of the rollers is driven synchronously with the other roller by means of at least, a pair of gears, at least one gear secured to each roller, preferably at the end thereof, with each gear driven by a separate one of a pair of meshed drive gears meshed with one another, for driving the gears secured to the rollers, the center of rotation of the drive gear to which the gear secured to the at least one moveable gear is secured, coinciding with the pivot point.

According to another aspect of the invention, the at least one moveable roller is moveable towards and away from the other roller in a vertical direction, the at least pair of gears for synchronously driving the rollers comprises two pairs of gears one on each end of the rollers and the roller is moveable towards and away from the other roller by an L-shaped press roll pivot arm or lever pivotable about the pivot point and secured to the moveable roller at one end and to a cylinder (preferably an air cylinder) at the other end for pivoting the arm or lever about the pivot point. Therefore, as the cylinder pivots the lever, the roller is elevated or lowered relative to the lower roller without disengagement of the upper drive gear and lower drive gear which reduces the possibility of slippage of the sheets of glass, substrate and carrier passing therebetween. In this manner, the opening between the rollers may be adjusted.

An air cylinder is most preferable for the operation and control of the lever as opposed to a hydraulic cylinder because the compressibility of the air cushions the use of the lever.

With the opening between the rollers set, it is preferable that the roller be acted upon quickly to enable the sheets of material to be engaged by the rollers, to be easily placed between the rollers and after the placing of the materials between the rollers, it is preferable that the rollers be repositioned to that preset opening just as quickly. To this end, according to another aspect of the invention, the position of the L-shaped lever can be set employing cam means, preferably an air cylinder controlled cam to locate the arm in a predetermined manner, preferably by the action of an air cylinder on the cam to control the position of the L-shaped lever.

According to another aspect of the invention, apparatus for applying adhesive is provided, comprising:

(a) an adhesive applicator for applying liquid adhesive to sheets of material, substrate or glass sheets, the applicator comprising a reservoir for the adhesive, a manifold to distribute the adhesive, a plurality of outlets opening from the manifold and a plurality of nozzles secured to the outlets that can be enabled or disabled according to need;

(b) A conveyor for carrying sheets of material, glass and substrate below the adhesive applicator;

(c) drive means for driving the sheets of material, glass and substrate below the adhesive applicator on the conveyor;

(d) means for controlling the movement of the material sheets, glass sheets and/or substrate on the conveyor below the applicator for stopping portions of the glass sheets or substrate below the applicator at predetermined positions for predetermined times.

According to another aspect of the invention, a method of applying adhesive onto sheets of material, glass sheets and/or substrate includes the steps of moving sheets of material, glass and/or substrate below an applicator and stopping a predetermined portion of the sheets of material glass and/or substrate under the applicator for the deposition of adhesive for a predetermined time and thereafter, passing the remaining surface of the material sheets, glass sheets or substrate below the applicator for the deposition of adhesive thereon in a predetermined pattern.

The invention will now be illustrated with reference to the following drawings illustrating embodiments of the invention.

BRIEF DESCRIPTION OF THE DRAWINGS

FIGS. 1 to 8 inclusive illustrate schematically a process for laminating glass according to an embodiment of the invention. With respect to these Figures, FIG. 1 is a perspective view illustrating one of the steps of the process;

FIG. 2 is a schematic side view of apparatus used to carry out one of the steps of the process;

FIG. 3 is a top view of part of the apparatus shown in FIG. 2 in operation;

FIG. 4 is a schematic view illustrating another of the steps of the illustrated process;

FIG. 5 is a schematic perspective view illustrating another of the steps of the process;

FIG. 6 is a schematic side view of the apparatus of FIG. 2 used to carry out other step of the process;

FIG. 7 is a schematic perspective view of the apparatus of FIG. 2;

FIG. 8 is a schematic perspective view illustrating one of the steps of a process;

FIG. 10 is a perspective schematic view of the essentials of apparatus and conveyor systems according to another embodiment of the invention;

FIG. 11 is a perspective view of a sheet of substrate to which liquid adhesive has been applied;

FIG. 12 is a perspective view of apparatus incorporating a portion of the apparatus shown in FIG. 10;

DESCRIPTION OF THE EMBODIMENTS

Figure 4:
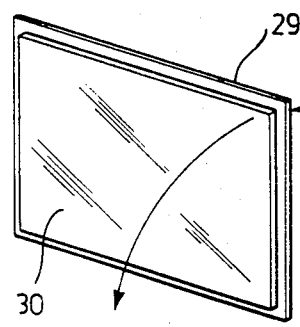

With reference to FIGS. 1 through 8 inclusive, a process for the lamination of sheets of glass according to an embodiment of the invention is illustrated together with apparatus and components for the apparatus, suitable for use to carry out the process, the process comprising the steps of:

(a) distributing a ribbon of liquid photopolymerisable adhesive composition on the upper surface of a substrate or interlayer (supported by a carrier) at least proximate one side edge of the sheet and extending across the sheet substantially parallel to the side edge with a plurality of ribbons of adhesive extending normal to the ribbon extending across the sheet in a direction away from the side edge;

(b) applying a sheet of glass of lesser length and width than the substrate to the substrate or interlayer, sandwiching the photopolymerisable adhesive composition between the sheet of glass and the substrate with edge portions of the substrate or interlayer extending beyond the edges of the glass sheet;

(c) applying pressure (employing a pair of pressure rollers) against the outer surfaces of the carrier and glass sheet substantially normal to the plane of the carrier, substrate and glass sheet at a position proximate the side edge to which the ribbon of adhesive has been applied across the sheet substantially parallel to the side edge to squeeze adhesive composition towards the side edge filling the gap between the glass sheet and the substrate proximate that side edge and expressing liquid adhesive composition from that side edge onto the substrate and to squeeze adhesive to the side of the position (plane or zone) of pressure application by the pressure rollers to form a continuous film of adhesive on the side of the rollers remote the side edge between the glass sheet and substrate and while continuing to apply the pressure moving the carrier, substrate and glass sheet combination between the rollers at a speed to ensure that the edge of film remote the position of pressure application is always maintained at a position spaced from the rollers on the side of the rollers remote the side edge until the carrier, substrate, and sheet of glass have entirely passed between the rollers to, uniformly spread the adhesive between the substrate and sheet of glass, eliminate air bubbles and cause excess adhesive to be expressed from the sides and the rearmost edge of the sheet of glass onto the substrate; and (d) thereafter, polymerizing the liquid adhesive with ultraviolet radiation.

In this manner, all air bubbles that appeared in the adhesive composition between the substrate and sheet of glass are pushed away from the side edge and expressed from the rear and other sides.

Thereafter, the sheet of glass-substrate combination (now secured together) is turned over on the carrier, the now upper surface of the substrate cleaned, liquid adhesive applied to the upper surface of the substrate and the other sheet of glass is applied and secured to the substrate (aligned with the first sheet) in the same manner as the first sheet was secured to the substrate and the process is duplicated as if the substrate and sheet of glass secured to the substrate was the substrate. As is apparent, the top roller must be adjustable to enable the various thicknesses of product to pass between the rollers under the desired pressure.

With reference to FIG. 11, the adhesive may also be applied to the substrate in the form of ribbons extending away from the side edge, spaced across the substrate or interlayer, with each ribbon extending for a substantial length of the substrate and having a greater amount of adhesive per unit length of ribbon, proximate the end of the ribbon nearest the side edge (in the form of a puddle) than in any other unit length of the remainder of the length of the ribbon.

Once the laminated glass sheet has been manufactured according to the process, the excess substrate is trimmed as for example, with a cutting knife and the side edges of the laminated glass sheet appropriately finished.

Particularly, with reference to FIG. 1, there is shown carrier 20, carrying a sheet of transparent PVC interlayer material 22, to which has been applied a ribbon of adhesive 24 extending across the interlayer 22 proximate side edge 26 and a plurality of ribbons 28 extending from ribbon 24 towards the rearmost edge 29 of interlayer or substrate 22. Liquid photopolymerisable adhesive composition was applied at ribbons 24 and 28 by the apparatus shown in FIGS. 18 to 23 inclusive, as will be more particularly described hereinafter.

With reference to FIG. 11, a plurality of ribbons 28' have been applied to substrate 22' from proximate side edge 26' towards rearmost edge 29' with puddles 28" of adhesive accumulated at the end of each ribbon 28' proximate side edge 26', each puddle comprising a greater amount or accumulation of adhesive per unit length of ribbon 28' than the remainder of the length of ribbons 28'.

With respect to FIG. 1, glass sheet 30 of lesser length and width than interlayer or substrate 22 is oriented with side edge 26a positioned proximate to, but spaced from, side edge 26 of substrate or interlayer 22 and thereafter, applied on substrate 22 to cover ribbons of adhesive 24 and 28, with substrate material extending from below each of the sides of glass sheet 30. In the same manner, a glass sheet may be applied to substrate 22' shown in FIG. 11.

With reference to FIG. 2, carrier 20 carrying interlayer or substrate 22 and glass sheet 30 is positioned on conveyor 32 and driven to a position between vertically spaced rollers 34 and 36 (upper roller 34 being moveable vertically relative to lower roller 36) so that edge 26a is just in advance (about 1" or 2.5 cm.) of the area of contact of upper roller 34 on glass sheet 30 when upper roller 34 is lowered onto sheet 30 from the raised dotted position as shown in FIG. 2 to the position shown, in the solid line, and pressure applied by air cylinder 33 (See FIG. 9) causing pressure to be applied by rollers 34 and 36 to carrier 20 at 38 and on glass sheet 30 at 40, squeezing adhesive (i) towards side edge 26a to fill gap 42 (FIG. 2) and express adhesive onto substrate 22 as at 43, (ii) laterally from the sides of sheet 30 at 31a and 31b onto the portion of the substrate 22 extending beyond the sides of the glass sheet 30 proximate side edge 26a and (iii) rearwardly towards edge 29 of substrate sheet 22 providing a continuous film 37 (See FIG. 3) of adhesive on the side of rollers 34 and 36 remote edge 26a extending across substrate 22 under glass sheet 30 between edges 31a and 31b and expressing adhesive onto substrate 22 as at 46.

Thereafter, the rollers are rotated by drive means (not shown) to feed the carrier-glass sheet-substrate combination in the direction towards leading edge 26a at a predetermined speed and at a predetermined applied roller pressure directed normal to the plane of the sheet of glass, substrate and carrier to cause edge 39 (See FIG. 3) of the adhesive film 37 on the side of pressure rollers 34 and 36 remote side edge 26 to be spaced from the plane or zone of roller pressure application at all times until the combination has been entirely passed through the plane of pressure applied by rollers 34 and 36, to uniformly spread the adhesive between the sheets, eliminate air bubbles and express adhesive from between the glass sheet 30 and substrate 22 as the film adhesive was pushed towards rear edge 29 from side edges 31a and 31b of glass 30 and rear edge 29 onto substrate 22 as at 46 (See FIG. 3).

After adhesive has been uniformly spread in the manner previously described between the glass sheet 30 and substrate 22 the sheet is irradiated with ultra violet radiation by passing the combination below parabolic reflector 56 carrying U.V. Lamps (not shown) whereat the adhesive composition polymerizes securing the glass sheet to the substrate. At the same time, expressed adhesive material 46 collected on the interlayer or substrate 22 extending beyond the edges of glass sheet 30 is polymerized by the ultra violet radiation.

Thereafter, glass sheet 30-substrate 22 combination is turned over (See FIG. 4), cleaned, and liquid photopolymerisable adhesive composition is applied thereto in the same manner as previously described. Particularly, adhesive 50 is deposited on surface 22a of substrate 22 proximate side edge 26 spaced from the edge thereof and spaced from edge 26a of lower glass sheet 30 previously secured to the other side of substrate 22. Thereafter, sheet of glass 30a aligned with sheet of glass 30 is applied to the adhesive (See FIG. 5) and passed between rollers 34 and 36 (See FIGS. 6 and 7) (adjusted to have a larger spacing therebetween) in the same manner as the combination shown in FIG. 2 was passed between rollers 34 and 36. (See FIGS. 5, 6 and 7.)

After irradiation by ultra violet radiation by ultra violet lamps (not shown) secured in parabolic reflector 56, the substrate material extending from the side edges of the laminated glass sheet as for example, at 60 (See FIG. 8) is trimmed and the glass sheet appropriately finished.

With reference to FIGS. 18 to 23 inclusive, there is shown adhesive applicator 62 set over conveyor 64, conveyor 64 comprising a pair of rails 66 and 68, rollers 70 and drive rollers 72, (See FIG. 19) on common shaft 74 for driving what is carried by the conveyor by drive means (not shown) controlled by control means (not shown) below adhesive applicator 62. A limit switch (not shown) stops the progress of the materials carried on the conveyor 64 at a predetermined position below applicator 62. Applicator 62 comprises a reservoir for liquid adhesive (not shown), manifold 76 having outlets 78 spaced at two inch centers from one another across manifold 76, each outlet 78 secured to a nozzle 80 "enabled" or "disabled" with respect to the flow of liquid photopolymerisable adhesive composition therethrough by means of lever operated pilot control valve 81 which either "allows" or "disallows" an air pilot signal from circuit 87 to the pilot operated valve 85 which controls the flow of adhesive. The flow rate of the adhesive through any nozzle 80 is further controlled by an adjustable needle valve 83 in-line with valve 85 and nozzle 80.

Figure 21:
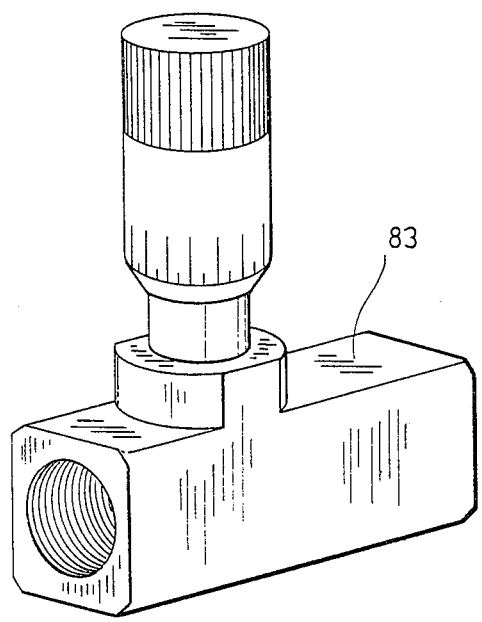

With reference to FIG. 21, needle valve 83 comprises Alkon JN1 TM adjustable needle valve.

Figure 22:
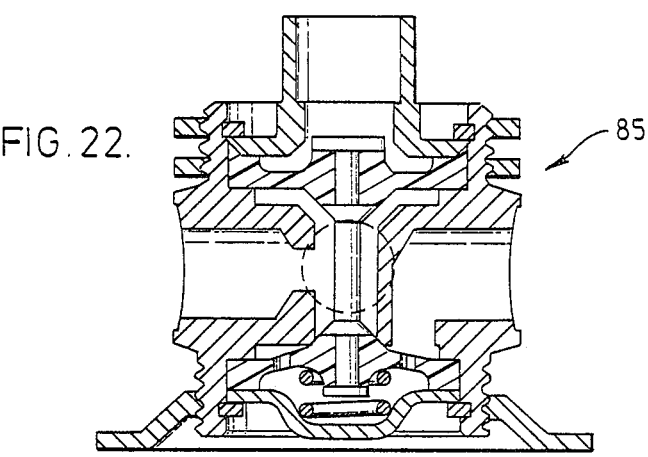

With reference to FIG. 22, pilot operated valve 85 comprises model 125A Humphrey TM normally closed pilot valve.

Figure 23:
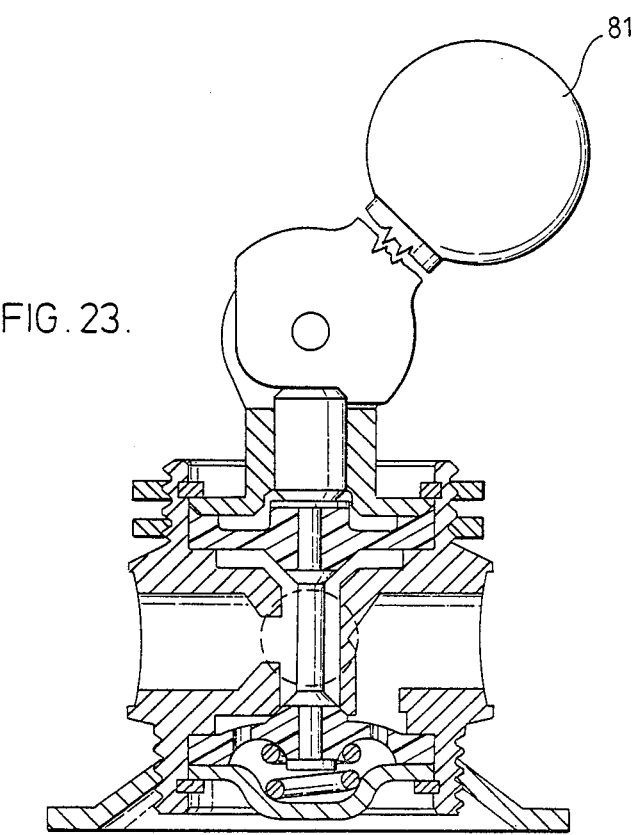

With reference to FIG. 23, lever operated pilot control valve 81 comprises model 125V Humphrey TM valve having positive detent in closed and open position, an actuator that can be rotated 360°, and toggle throw.

Figure 5:
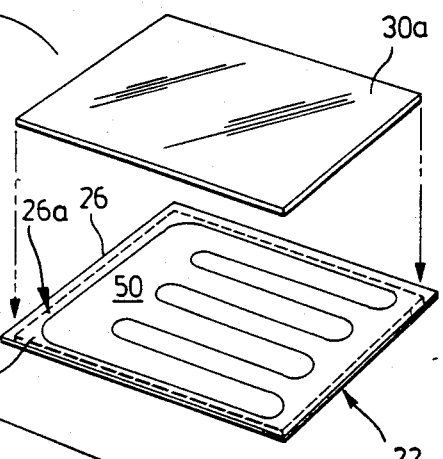
Figure 6:
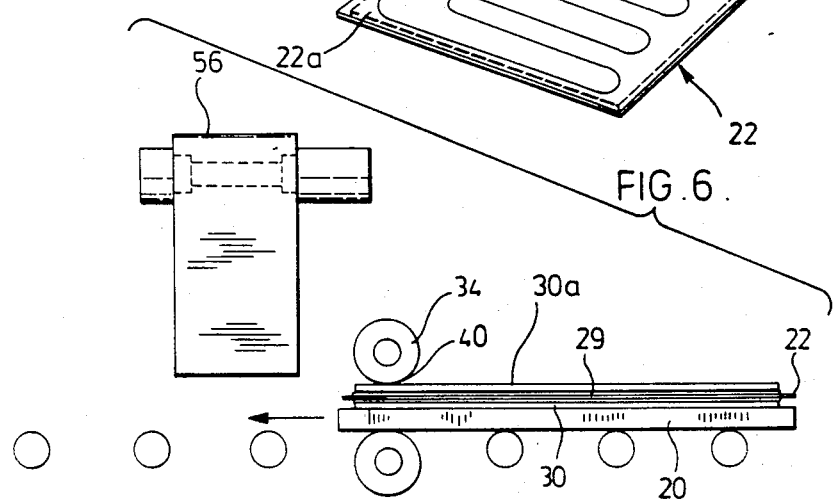
Figure 7:
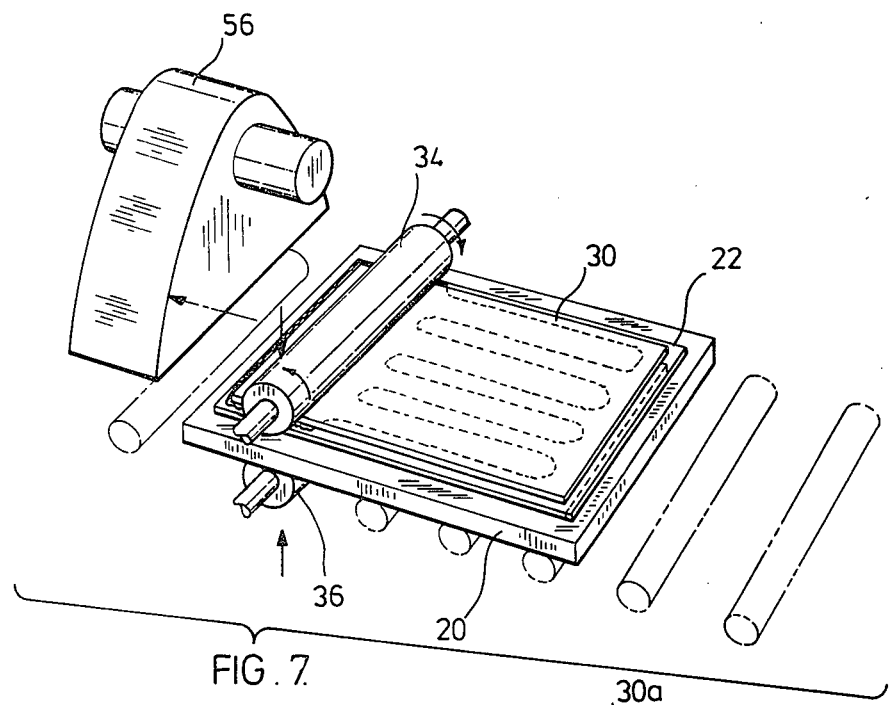
Figure 8:
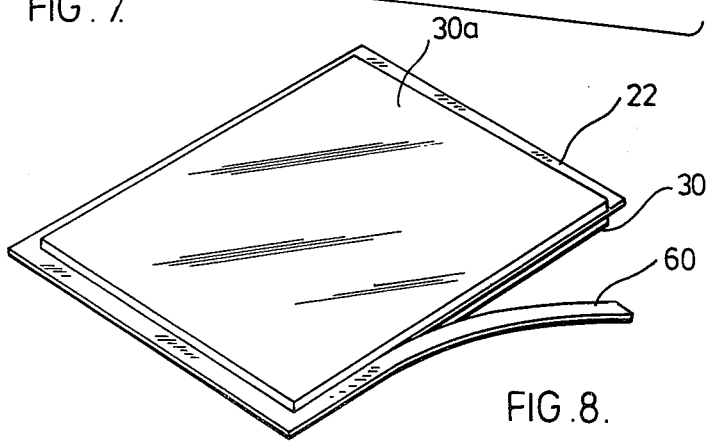

With respect to the application of the adhesive in the patterns shown in FIG. 1 (carrier 20 carrying substrate 22) and 5 (carrier 20 carrying the combination of glass sheet 30 below substrate 22), carrier 20 is moved by rollers 72 until carrier 20 engages a limit switch (not shown) positioning nozzles 80 over substrate 22 spaced from, but proximate edge 26 to be within the surface area to be covered, in the case of FIG. 1, by glass sheet 30, and in the case of FIG. 5, by glass sheet 30a, proximate edges 26a. Thereafter, by activating certain ones of valves 85 by means of the lever operated pilot control valves 81, adhesive composition is released through each of nozzles 80 for a certain predetermined period of time controlled by control means (not shown) creating an accumulation of adhesive proximate side edge 26 which accumulation from each of nozzles 80 flows one into the other creating ribbon of adhesive 24.

In respect of the adhesive deposited on substrate 22' shown in FIG. 11, a greater number of valves 85 have been activated providing puddles 28" proximate side edge 26'.

After a specified delay, carrier 20 carrying substrate 22 or 22' is driven below valves 85 which deposit ribbons of adhesive 28 (shown in FIG. 1) and 28' (shown in FIG. 11). Thereafter, valves 85 are disabled stopping the flow of adhesive. Carrier 20 is then moved to its next position whereat the glass is applied (See FIGS. 1 and 5) and then between rollers 34 and 36 for the application of pressure for the spreading of the adhesive.

Figure 9:
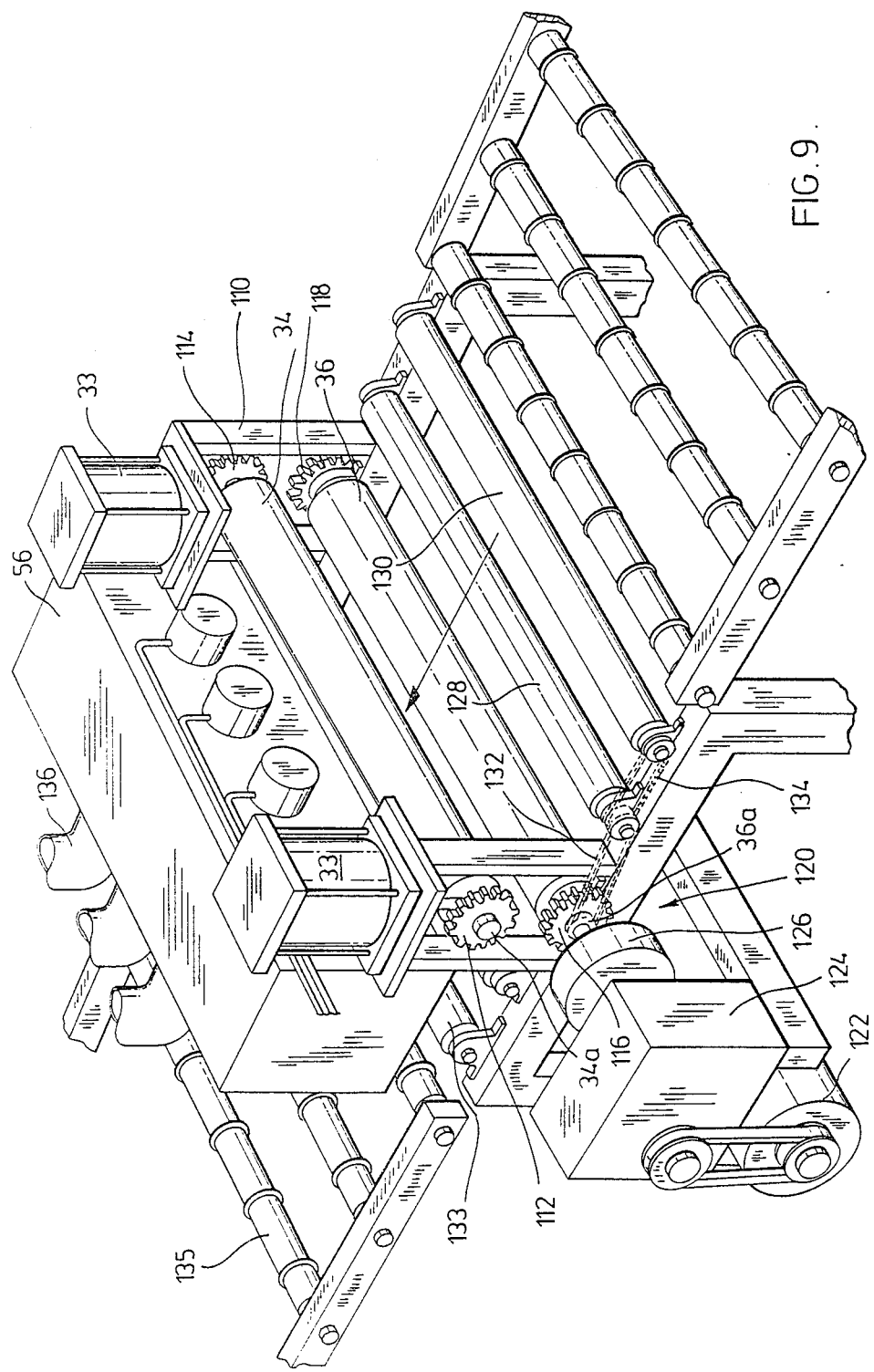
FIG. 9 is a perspective view of an apparatus according to an embodiment of the invention.

With reference to FIG. 9, rollers 34 and 36 comprising resilient rubber material, are mounted in frame 110 for vertical reciprocation of roller 34 relative to roller 36 by air cylinders 33 between a lowered position with the roller surface of rollers 34 and 36 touching, to a raised position with roller 34 spaced from roller 36. Journaled for rotation on the end of shafts 34a and 36a carrying rollers 34 and 36 respectively, are gears 112, 114, 116 and 118 having a slightly greater outer diameter than rollers 34 and 36, gears 112 and 116, and gears 114 and 118, for intermeshing when roller 34 is lowered towards roller 36.

Roller 36 is rotated as shaft 36a is rotated by drive 120 comprising electric motor 122, gear box 124 and coupling 126. Feed rollers 128 and 130 are rotated by chains 132 and 134 secured to be operated by the rotation of shaft 36a to feed carrier 20 towards rollers 34 and 36 at the same velocity as the velocity of the outer surface of rollers 34 and 36. By adjusting the velocity of the roller 36 driven by direct drive 120, and the vertical pressure exerted by air cylinders 33, the edge 39 of film 37 (See FIG. 3) on the side of the rollers 34 and 36 remote leading edges 26 and 26a of substrate 22 and either of glass sheets 30 and 30a (as the case may be) is spaced from roller 34 at all times as the substrate-glass sheet combination is fed through the rollers until the combination has passed between the position (plane or zone) of pressure application. By varying the speed of the drive 120 or the pressure of the rollers the spacing of edge 39 of adhesive film 37 from the plane or zone of pressure created by rollers 34 and 36, is controlled ensuring thorough uniform application of the adhesive between the substrate and glass sheet and complete elimination of air bubbles from between the sheet of glass and substrate. Upon completion of the uniform spreading of the adhesive between the glass and substrate, the combination is immediately moved by pickup rollers 133 (See FIG. 9) below parabolic reflector 56, carrying ultra violet lamps (not shown) whereat the adhesive is polymerized. Conveyor 135 leading away from below reflector 56 takes away the polymerized product. Exhausts 136 lead from parabolic reflector 56 for dispersing the heat generated.

FIG. 10 illustrates schematically a preferred system used for the manufacture of laminated glass comprising adhesive applicator 62, conveyor 64, (See FIG. 18), rollers 34 and 36, ultraviolet lamps 140, and take up rollers 133.

Figure 13:
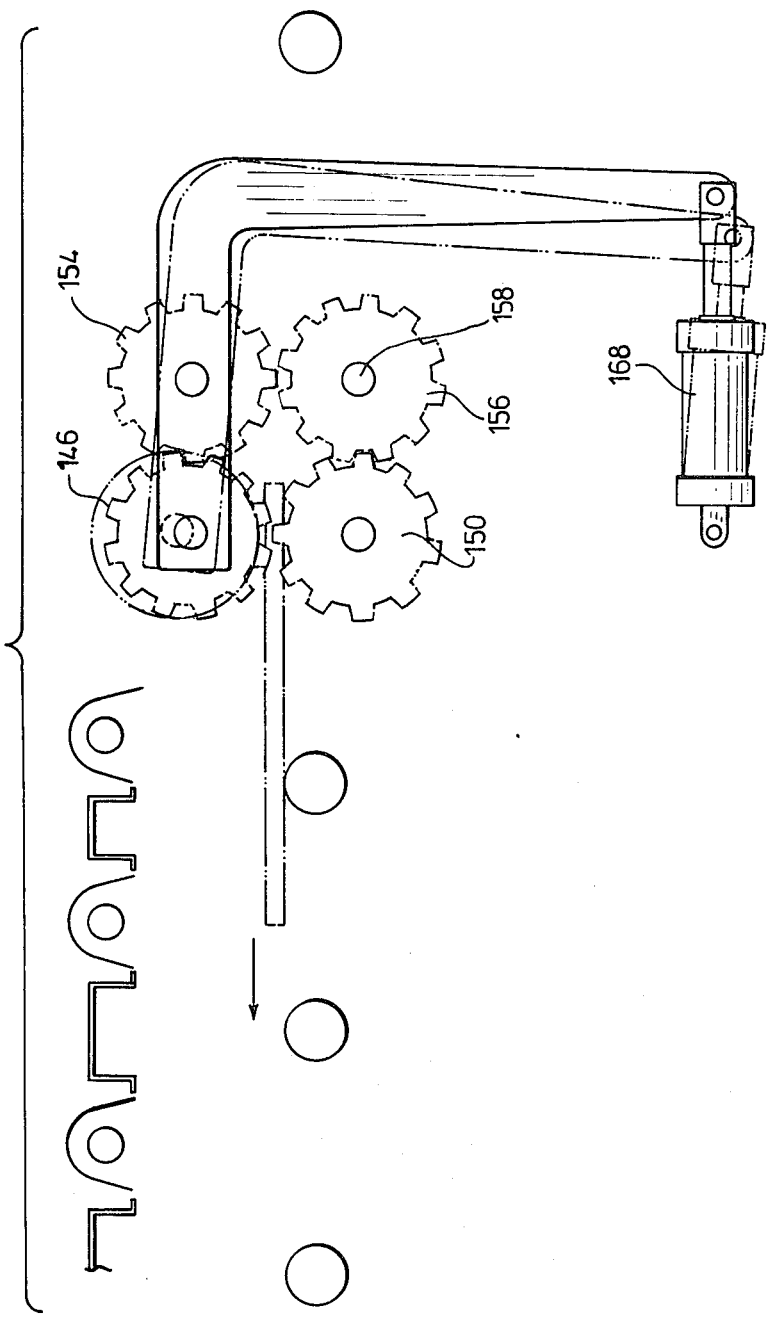
FIG. 13 is a schematic view of components of the apparatus shown in FIG. 12.

With reference to FIGS. 10, 12 and 13, rollers 34 and 36 are mounted and operated in a manner to reduce the possibility of slippage of the sheets of glass, substrate and carrier relative to one another during the application of pressure by the rollers and the movement of the combination between the rollers. Particularly, rollers 34 and 36 are journalled for rotation about axes 142 and 144 respectively. Four gears, three of which are shown at 146, 148, and 150 are secured to both ends of axes 142 and 144, gears 146 and 148 to axis 142 and gears 150 and the other gear (not shown) to axis 144. On one side of rollers 34 and 36 gears 146 and 150 are driven synchronously with one another by meshed gears 154 and 156, gear 154 meshed with and driving gear 146 and gear 156 meshed with, and driving gear 150. Gear 146 is secured to one end of L-shaped lever arm 162, in turn secured to, and pivotable about axis 160 about which gear 154 rotates. Roller 36 and gear 150 are fixed in position on axis 144 but are free to rotate. Roller 34 and gears 146 and 148 fixed on axis 142, are secured to lever arm 162 to pivot about axis 160 as lever arm 162 pivots raising and lowering roller 34 and associated gears 146 and 148, with respect to roller 36 and gear 150. Both gears 150 and 156 are fixed in stationary frame member 157 (See FIG. 12) for rotation about axes 144 and 158 respectively. Air cylinder 168 is secured to arm 162 to pivot L-shaped lever arm 162 about axis 160. A like gear train, L-shaped lever arm and air cylinder are provided on the other side of the frame to assist in the pivoting of roller 34 about axis 160 and drive gears 148 and 152. (Therefore, any discussion to the assembly on one side of rollers 34 and 36 applies equally to the assembly on the other side of rollers 34 and 36).

In use, roller 34 is raised by the action of cylinder 168 on arm 162 drawing arm 162 towards cylinder 168, rotating roller 34 and gears 146 and 148 about axis 160 spacing roller 34 from roller 36. When roller 34 is to be lowered to a different position, a predetermined distance above roller 36, cylinder 168 is activated pushing arm 162 away from cylinder 168, causing arm 162 to pivot about axis 160.

With reference to FIGS. 12 and 13, it can be seen that as L-shaped lever 162 is pivoted about axis 160 as cylinder 168 acts on arm 162 pushing or pulling lever 162 away from, or towards, cylinder 168 as the case may be, roller 34 will be raised or lowered while the gear train (comprising gears 146, 154, 156 and 150) remains engaged, thereby reducing the possibility of relative slippage of the sheets of glass, carrier and substrate when the combination is passed between the rollers.

For driving gears 146, 154, 156 and 150, a drive similar to drive 120 comprising electric motor, gear box and coupling for securing to axis 158 about which gear 156 rotates, is used to drive gear 156 and thus gear 154, which gears in turn drive gears 150 and 146 respectively.

Figure 14:
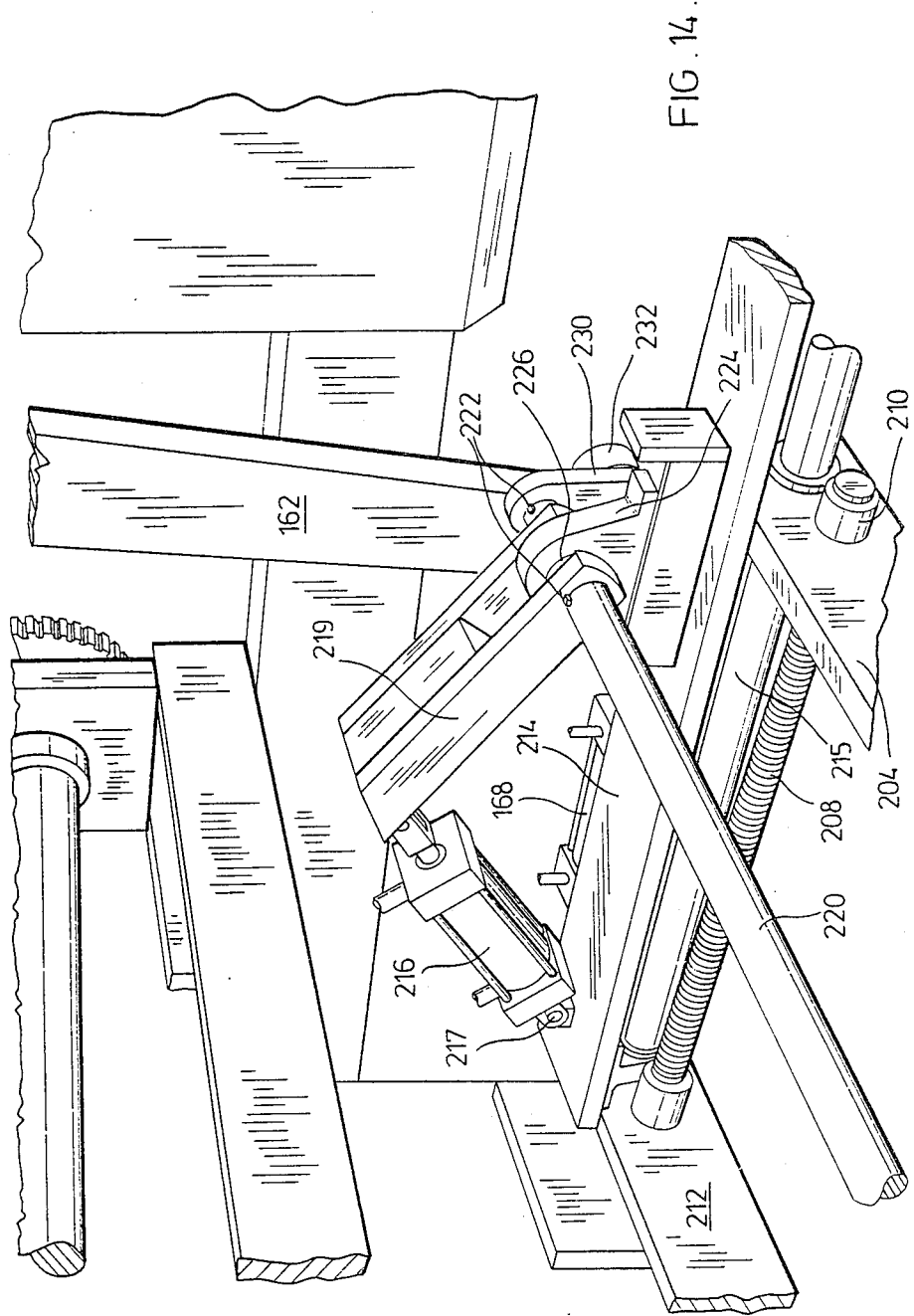
FIGS. 14 through 16 inclusive are perspective views of parts of the apparatus shown in FIG. 12.
Figure 15:
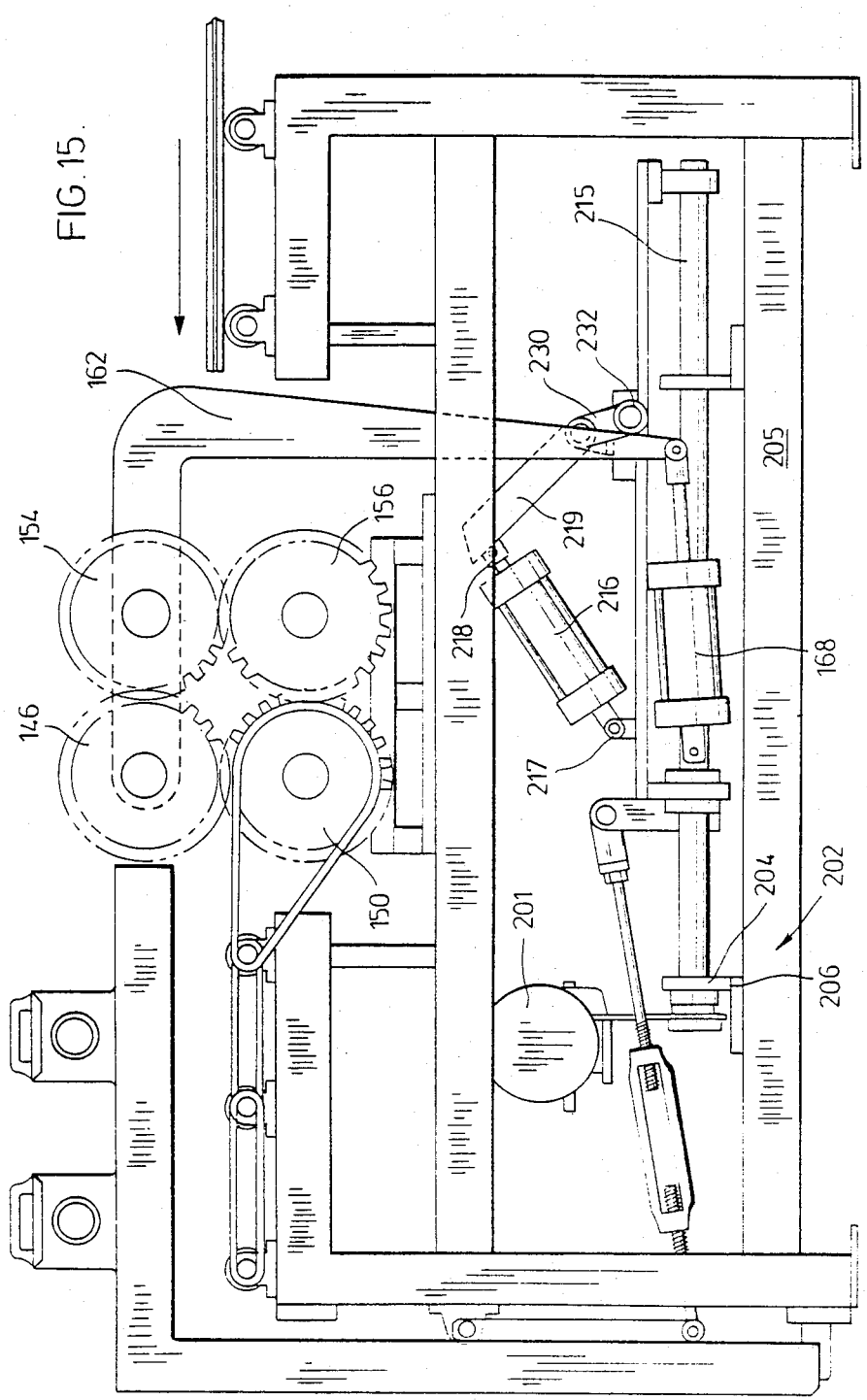
Figure 16:
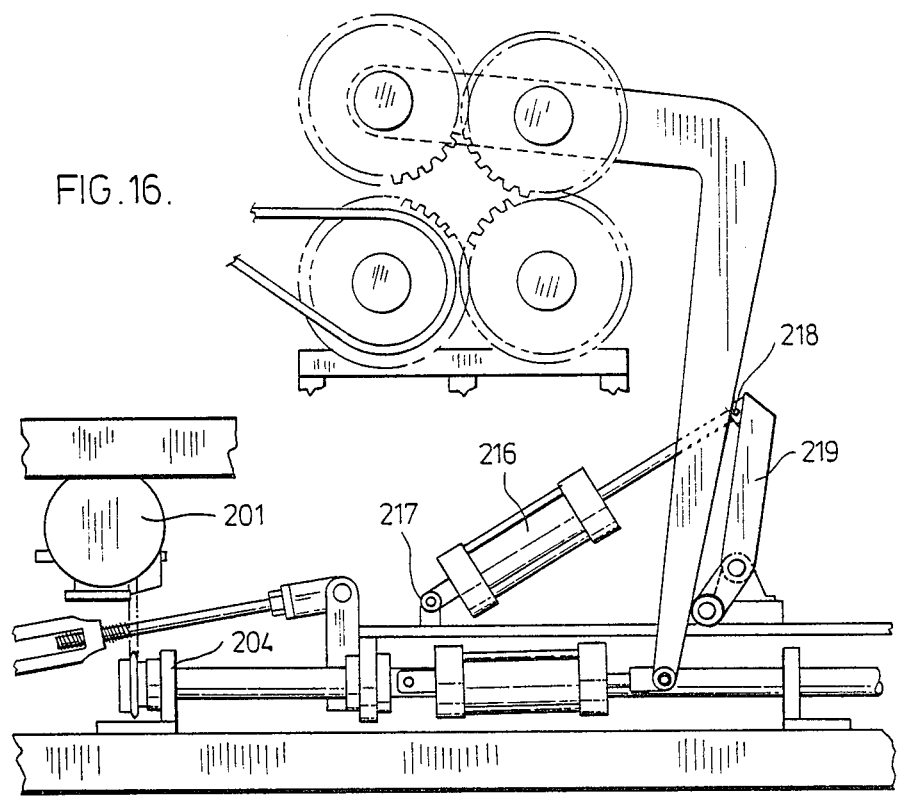

For adjusting the opening between rollers 34 and 36 to permit laminations of various thicknesses to pass therethrough under the pressure to be applied by rollers 34 and 36, the position of rollers 34 and 36 relative to one another are adjusted by the raising and lowering of roller 34 with respect to roller 36 by the action of cylinder 168 on arm 162. To preclude having to reset the opening between the rollers with the introduction of each combination of the same thickness to be laminated, additional equipment is provided as shown in FIGS. 14, 15, and 16. With respect thereto, cylinder 168 is secured to frame 202 with arm 162 connected to cylinder 168. Frame 202 supports motor 201 and transverse beam 204 secured to bottom frame beam members 205 at 206 on either side of frame 202.

Motor 201 synchronously drives longitudinally extending screws on either side of motor 201 (one of which screws is shown at 208) by cogs (not shown) to pass through threaded conduit 210 through transverse beam 204 causing transverse member 212 (secured to each of screws 208) and longitudinally extending platforms 214 (only one of which is shown) carried proximate either transverse side of frame 202 to be moved longitudinally of the frame. Smooth shafts or rods 215 (one on either side secured to frame 202) pass through members 212 and 204 proximate either transverse end of each member 212 and 204 for supporting weight. Each platform 214 (one on either side of frame 202) pivotally supports air cylinder 216 at 217. Cylinder 216 is pivotally secured at its operative end 218 to arm 219 fixed to transversely extending shaft 220 by pins 222. Each platform 214 carries shaft support 224 having aperture 226 therethrough for supporting and carrying shaft 220.

Radially extending arm 230 extends radially from the end of shaft 220 and secures Cam 232 at its end in the same longitudinally extending plane as arm 162 for pushing against arm 162 to drive one end towards cylinder 168 against pressure in cylinder 168.

When it is desired to space rollers 34 and 36 by a predetermined distance for the passage of glass therebetween, arm 162 is pivoted on axis 160 to bring rollers 34 and 36 to the predetermined spaced distance. For rapid "opening" and "closing" of the rollers relative to this preset position cylinder 216 is activated rotating arm 230 and cam 232 rotating arm 162 to either "open" the rollers from the preset spaced position enabling sheet material to be easily positioned or "close" the rollers to the preset spaced position onto the material to be acted upon by the rollers. Adjustment of the relative position of platform 214 may be made by activating motor 201 and threaded rods 208 as desired.

These adjustments may be automated by a control system (not shown) for causing roller 34 to be raised to permit the combination glass-adhesive-substrate to be positioned in the plane of pressure and thereafter, roller 34 lowered onto the combination glass-adhesive-substrate combination proximate the leading edge of the combination (See FIG. 2) to the preset position.

Figure 24:
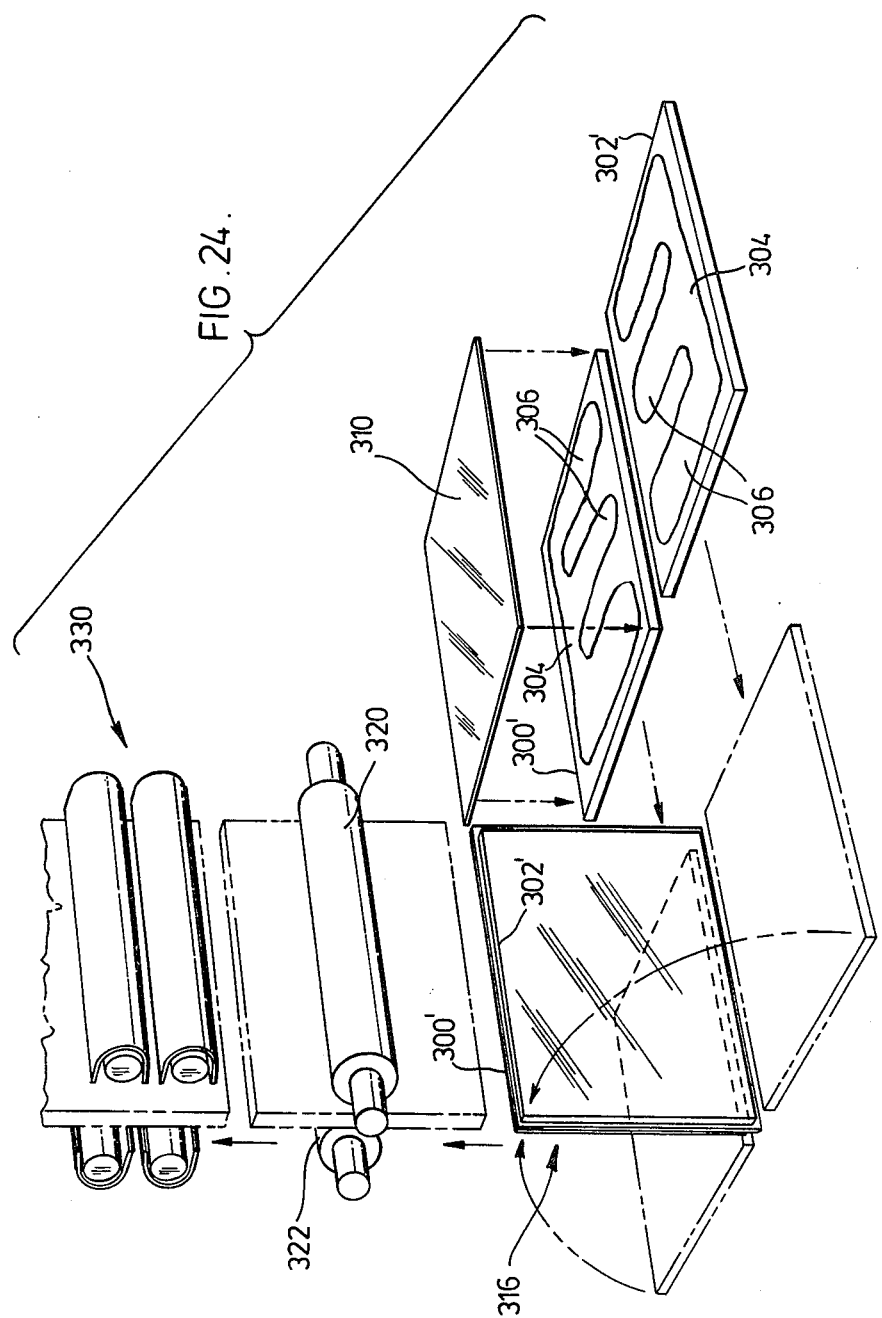
FIGS. 24 and 25 are schematic views illustrating process steps for laminating glass according to other embodiments of the invention.
Figure 25:
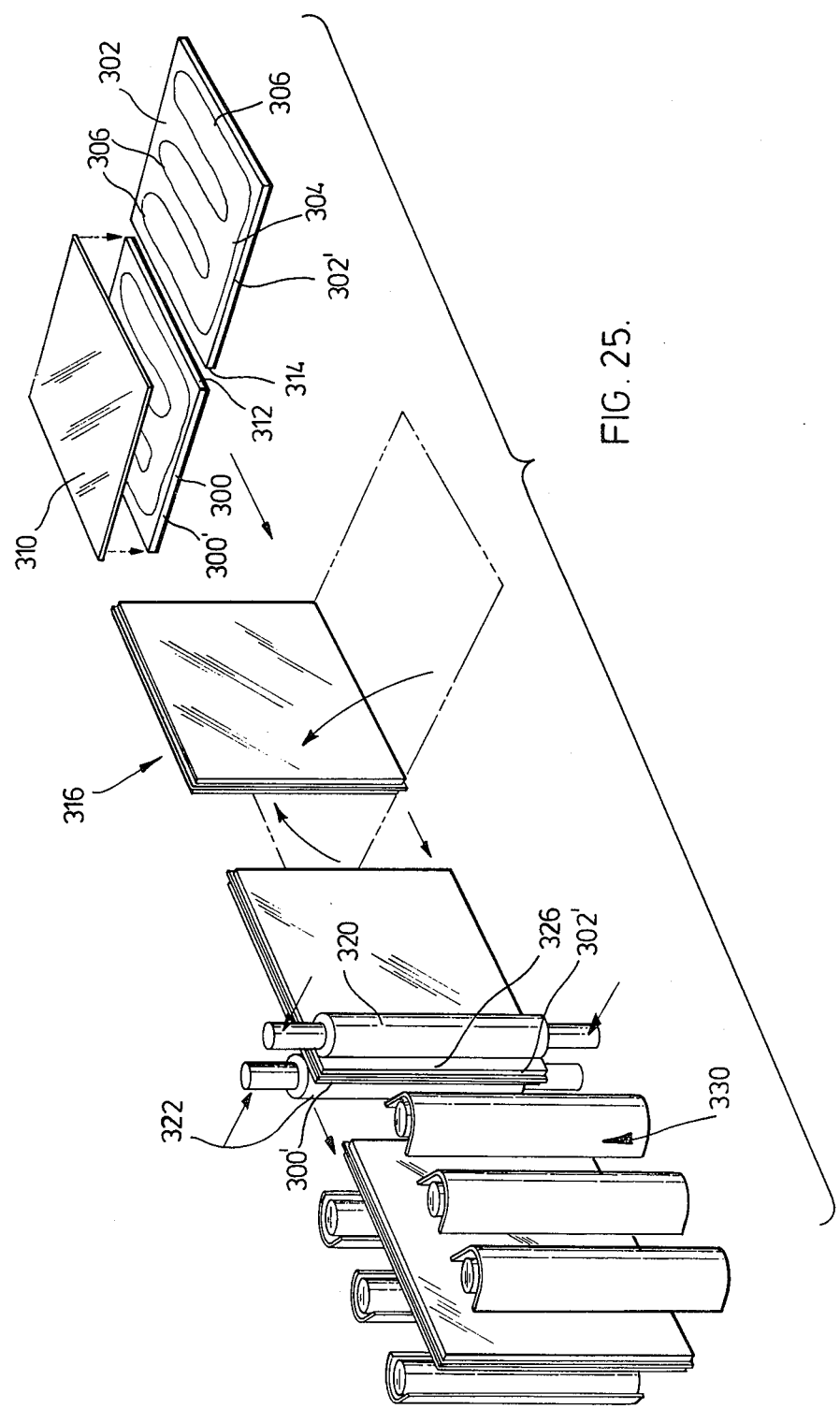

With reference to FIGS. 24 and 25, there is shown schematically two additional processes for the lamination of glass.

With respect to FIG. 25, two glass sheets 300 and 302 of identical shape and size have adhesive deposited on their upper surface to provide a ribbon of adhesive 304 proximate side edges 300' and 302' and ribbons of adhesive 306 extending from each of ribbons 304 away from edges 300' and 302'. A sheet of substrate 310 is then applied to glass sheet 300 and the sheets of glass 300 and 302 pivoted on their side edges 312 and 314 closer to the other sheet and sandwiched together as at 316 in FIG. 25 to be oriented vertically. Thereafter, the combination is positioned between vertically oriented rollers 320 and 322 (of lesser length than the width of the sheets of glass) with edges 300' and 302' positioned just beyond (downstream of) rollers 320 and 322 with rollers 320 and 322 spaced from the surfaces. Thereafter rollers 320 and 322 are brought to bear on the surfaces of the glass providing the requisite plane or zone of pressure to force adhesive to fill the gap 326 between the glass surfaces and substrate in advance of the plane of pressure by rollers 320 and 322 and leading edges 300' and 302' expressing adhesive therefrom. Because the rollers are of lesser length than the width of the glass (See FIG. 25) any adhesive expressed does not collect on the roller. At the same time, continuous films of adhesive are formed between the substrate and sheets of glass on the side of the plane of pressure application (created by the rollers) remote sides 300' and 302' with the edge of each of the two continuous films extending across the sheets of glass 300 and 302 between the sheets of glass 300 and 302 and the substrate 310, spaced from the plane of pressure application. Thereafter, rollers 300 and 302 are rotated to move the combination therebetween in such a manner to ensure the edge of the film remote the position (plane or zone) of pressure was always spaced from the position (plane or zone) of pressure application until the combination has passed through the plane of pressure application to, uniformly spread the adhesive between the substrate and sheets of glass, and eliminate air bubbles. Thereafter, the adhesive is irradiated by U.V. Lamps 330 and the expressed polymerized adhesive cleaned from the sides of the laminated glass.

With reference to FIG. 24, the only difference from the schematic of the process steps illustrated in FIG. 24 from those in FIG. 25 is that the combination is fed vertically through the rollers and between the ultra violet lamps.

Figure 17:
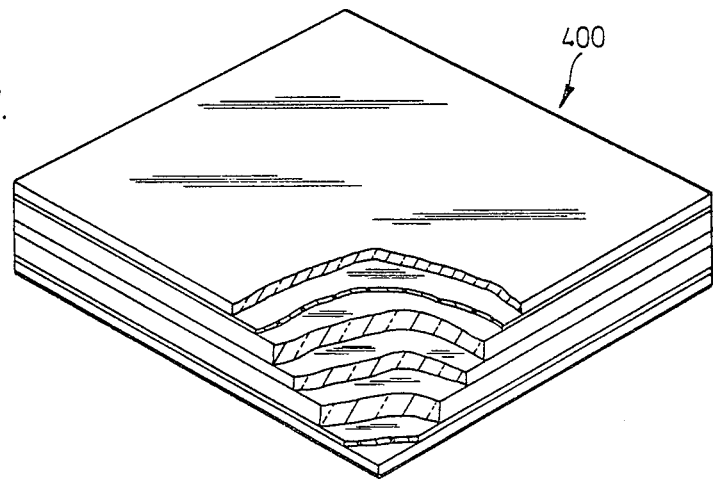
FIG. 17 is a perspective partly sectioned view of a composite glass substrate structure.
Figure 18:
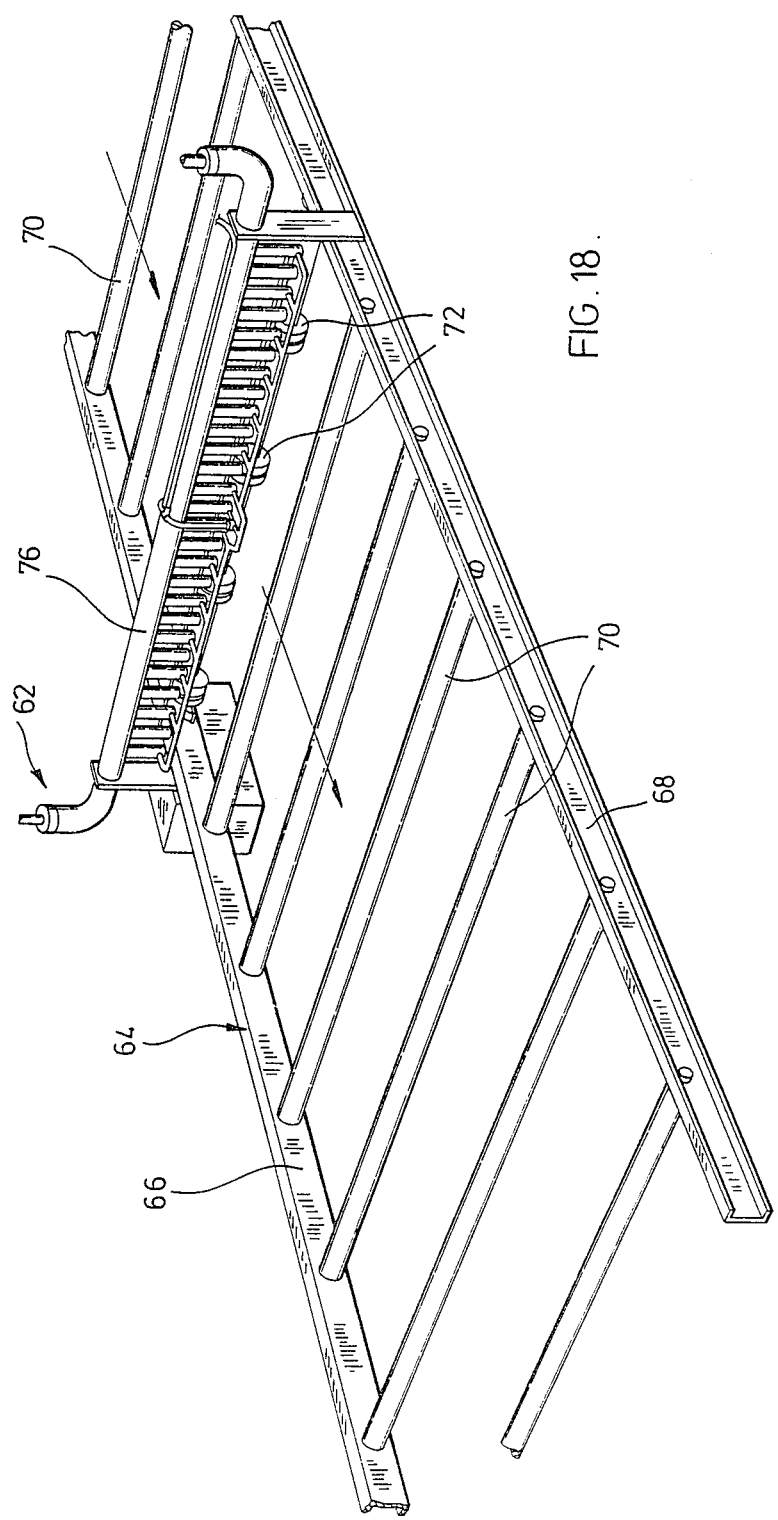
FIG. 18 is a perspective view of an adhesive applicator according to another embodiment of the invention.
Figure 19:
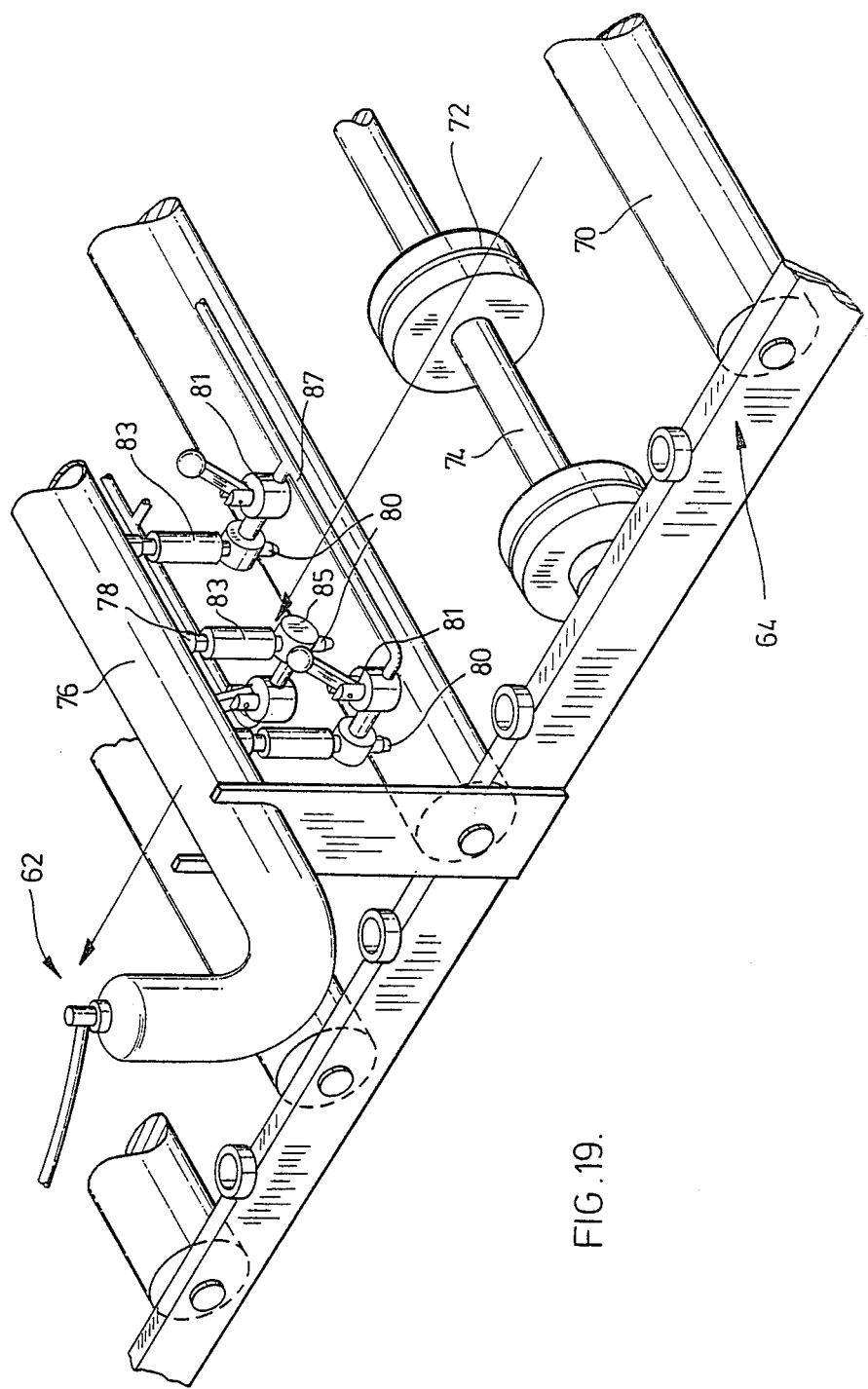
FIG. 19 is a close-up view of part of the structure shown in FIG. 18.
Figure 20:
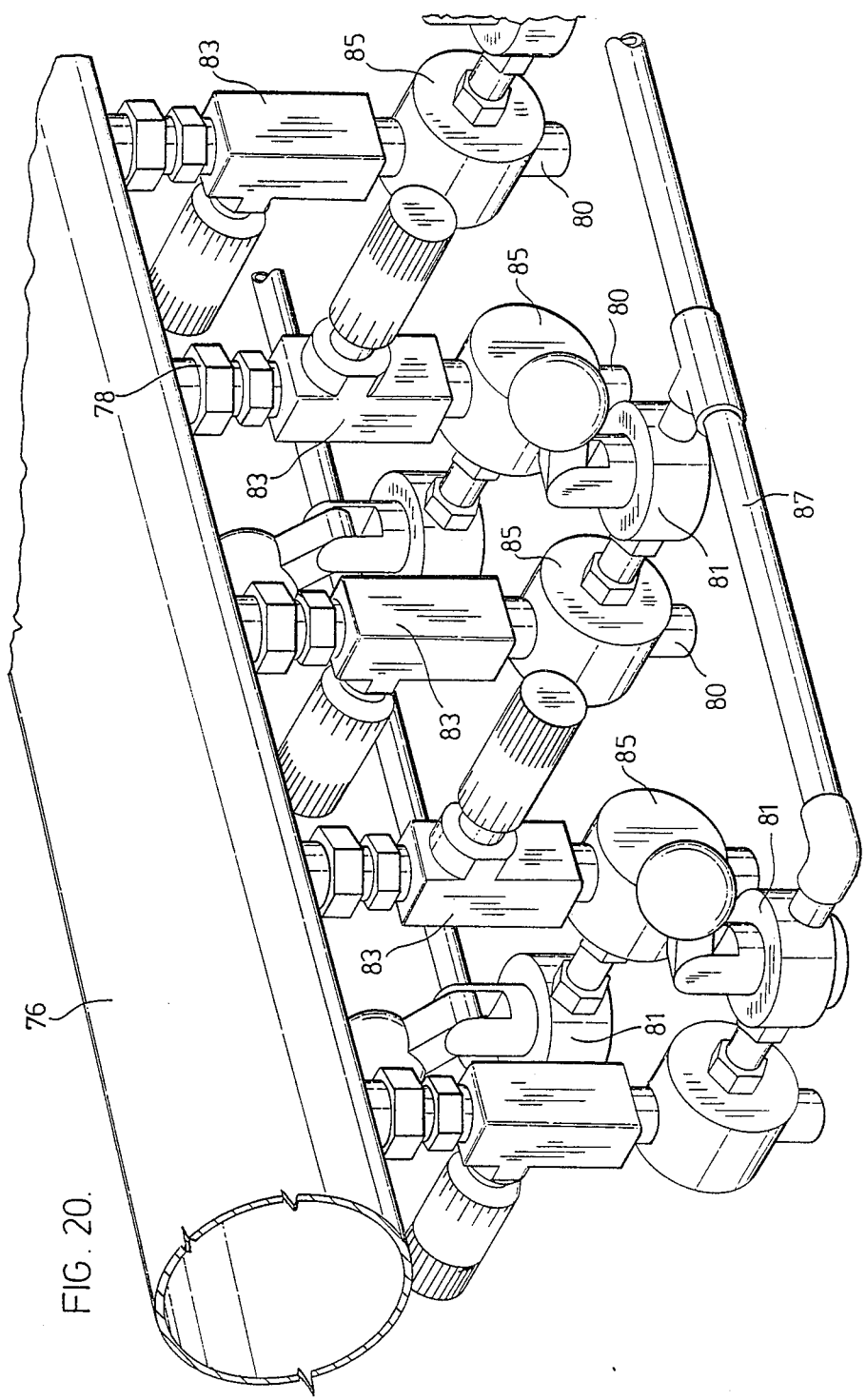
FIGS. 20 through 23 inclusive illustrate various components used in the structure shown in FIG. 19.

With reference to FIG. 17, multi-laminated glass 400 is shown, manufactured in accordance with a process according to an embodiment of the invention comprising five (5) sheets of glass and two(2) sheets substrate secured together by photopolymerized adhesive.

As many changes could be made to the embodiments of the invention described without departing from the scope of the invention, it is intended that all matter contained herein shall be interpreted as illustrative of the invention and not in a limiting sense.

The embodiments of the invention in which an exclusive property or privilege is claimed are as follows:

1. In a process for the joining of two sheets of material together, one of which sheets being transparent, the process comprising the steps of:
   (a) distributing liquid radiation curable adhesive composition on one surface of one of the sheets at least proximate one side edge across the sheet and preferably along a portion of the length of the sheet;

(b) applying the other sheet to the adhesive covered sheet;

(c) applying pressure against each of the sheets in at least a plane substantially normal to the planes of the sheets, proximate to and parallel to, the side edge, to squeeze adhesive towards the side edge filling any gap between the sheets between the position of initial pressure application and the side edge, and away from the plane of pressure application on the side of the plane of pressure application remote the side edge to form a continuous film of adhesive on the side of the plane of pressure remote the side edge across the sheets between the sheets, and thereafter, while continuing to apply pressure, moving the plane of pressure relative to the sheets away from the side edge or moving the sheets relative to the plane of pressure in the direction towards the side edge ensuring that the edge of the film remote the plane of pressure is always spaced from the plane of pressure until the sheets have passed through or been passed through the plane of pressure, to uniformly spread the adhesive between the sheets and eliminate air bubbles; and (d) thereafter, curing the liquid adhesive composition by irradiation.

2. In the process of claim 1, wherein the two sheets of material comprise glass and/or plastics material.

3. In the process of claim 1, wherein the two sheets of material comprises two sheets of glass.

4. In the process of claim 1, wherein the two sheets of material comprises one glass sheet of material and the other a transparent substrate or interlayer plastics material.

5. In the process of claim 4, wherein the plastics material comprises PVC, PVB or polyurethane material.

6. In the process of claim 1, wherein the liquid adhesive composition distributed on the surface of one of the sheets comprises a plurality of ribbons of liquid adhesive spaced across the sheet, each ribbon extending along at least a portion of the length of the sheet.

7. In the process of claim 2, wherein the liquid adhesive composition distributed on the surface of one of the sheets comprises a plurality of ribbons of liquid adhesive spaced across the sheet, each ribbon extending along at least a portion of the length of the sheet.

8. In the process of claim 3, wherein the liquid adhesive composition distributed on the surface of one of the sheets comprises a plurality of ribbons of liquid adhesive spaced across the sheet, each ribbon extending along at least a portion of the length of the sheet.

9. In the process of claim 4, wherein the liquid adhesive composition distributed on the surface of one of the sheets comprises a plurality of ribbons of liquid adhesive spaced across the sheet, each ribbon extending along at least a portion of the length of the sheet.

10. In the process of claim 5, wherein the liquid adhesive composition distributed on the surface of one of the sheets comprises a plurality of ribbons of liquid adhesive spaced across the sheet, each ribbon extending along at least a portion of the length of the sheet.

11. In the process of claim 6,7, or 8 wherein each ribbon of adhesive extending along at least a portion of the length of the sheet has a greater amount of adhesive per unit length of ribbon in the form of a puddle proximate the end of the ribbon nearest the side edge.

12. In the process of claim 9 or 10, wherein each ribbon of adhesive extending along a least a portion of the length of the sheet has a greater amount of adhesive per unit length of ribbon in the form of a puddle proximate the end of the ribbon nearest the side edge.

13. In the process of claim 1,2 or 3, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

14. In the process of claim 4 or 5, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

15. In a process for the joining of two sheets of material together, one of which being transparent, the process comprising the steps of:
(a) distributing liquid radiation curable adhesive composition on one surface of one of the sheets at least proximate one side edge across the sheet and along a portion of the length of the sheet;
(b) applying the other sheet to the adhesive covered sheet;
(c) applying pressure against each of the sheets in at least a plane substantially normal to the planes of the sheets, proximate to, and parallel to, the side edge, to squeeze adhesive towards the side edge filling any gap between the sheets between the position of initial pressure application and the side edge, and away from the plane of pressure application on the side of the plane of pressure application remote the side edge to form a continuous film of adhesive on the side of the plane of pressure remote the side edge, across the sheets between the sheets, and thereafter, while continuing to apply pressure in the plane, moving the sheets relative to the plane of pressure in the direction towards the side edge ensuring that the edge of the film remote the plane of pressure is always spaced from the plane of pressure until the sheets have passed through the plane of pressure, to uniformly spread the adhesive between the sheets, and eliminate air bubbles; and
(d) thereafter, curing the liquid adhesive composition by irradiation.

16. In the process of claim 15, wherein the two sheets of material comprise glass and/or plastics material.

17. In the process of claim 15, wherein the two sheets of material comprises two sheets of glass.

18. In the process of claim 15, wherein the two sheets of material comprises one glass sheet of material and the other a transparent substrate or interlayer plastics material.

19. In the process of claim 18, wherein the plastics material comprises PVC, PVB or polyurethane material.

20. In the process of claim 15, wherein the liquid adhesive composition distributed on the surface of one of the sheets comprises a plurality of ribbons of liquid adhesive spaced across the sheet, each ribbon extending along at least a portion of the length of the sheet.

21. In the process of claim 16, wherein the liquid adhesive composition distributed on the surface of one of the sheets comprises a plurality of ribbons of liquid adhesive spaced across the sheet, each ribbon extending along at least a portion of the length of the sheet.

22. In the process of claim 17, wherein the liquid adhesive composition distributed on the surface of one of the sheets comprise a plurality of ribbons of liquid adhesive spaced across the sheet, each ribbon extending along at least a portion of the length of the sheet.

23. In the process of claim 18, wherein the liquid adhesive composition distributed on the surface of one of the sheets comprises a plurality of ribbons of liquid adhesive spaced across the sheet, each ribbon extending along at least a portion of the length of the sheet.

24. In the process of claim 19, wherein the liquid adhesive composition distributed on the surface of one of the sheets comprises a plurality of ribbons of liquid adhesive spaced across the sheet, each ribbon extending along at least a portion of the length of the sheet.

25. In the process of claim 20, 21 or 22, wherein each ribbon of adhesive extending along at least a portion of the length of the sheet has a greater amount of adhesive per unit length of ribbon in the form of a puddle proximate the end of the ribbon nearest the side edge.

26. In the process of claim 23 or 24, wherein each ribbon of adhesive extending along a least a portion of the length of the sheet has a greater amount of adhesive per unit length of ribbon in the form of a puddle proximate the end of the ribbon nearest the side edge.

27. In the process of claim 15, 16 or 17, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

28. In the process of claim 18 or 19, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

29. In a process for the manufacture of laminated glass comprising sheets of glass and a liquid radiation curable adhesive composition for bonding the glass, the process comprising the steps of:
(a) distributing the liquid adhesive composition on one surface of one sheet of glass at least proximate one side edge across the sheet and along a portion of the length of the sheet;
(b) applying the other sheet of glass to the adhesive covered sheet of glass;
(c) applying pressure against each of the sheets of glass in at least a plane substantially normal to the planes of the sheets of glass, proximate to, and parallel to, the side edge, to squeeze adhesive, towards the side edge filling any gap between the sheets of glass between the position of initial pressure application and the side edge, and away from the plane of pressure application on the side of the plane of pressure application remote the side edge to form a continuous film of adhesive on the side of the plane of pressure remote the side edge, across the sheet of glass, between the sheets of glass, and thereafter, while continuing to apply pressure in the plane, moving the sheets of glass relative to the plane of pressure in the direction towards the side edge ensuring that the edge of the film remote the plane of pressure is always spaced from the plane of pressure until the sheets have passed through the plane of pressure to uniformly spread the adhesive between the sheets and eliminate air bubbles; and
(d) thereafter, curing the liquid adhesive composition by irradiation.

30. In the process of claim 29, wherein the liquid adhesive composition distributed on the surface of one of the sheets comprises a plurality of ribbons of liquid adhesive spaced across the sheet, each ribbon extending along at least a portion of the length of the sheet.

31. In the process of claim 30, wherein each ribbon of adhesive extending along at least a portion of the length of the sheet has a greater amount of adhesive per unit length of ribbon in the form of a puddle proximate the end of the ribbon nearest the side edge.

32. In the process of claim 29, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

33. In a process for the manufacture of laminated glass comprising sheets of glass, a substrate or interlayer and a liquid radiation curable adhesive composition for bonding the glass sheets to the substrate or interlayer, the process comprising the steps of:
(a) distributing the liquid adhesive composition on one surface of the substrate or interlayer at least proximate one side edge of the sheets, across the sheet and along a portion of the length of the sheet;
(b) applying a sheet of glass to the surface of the substrate or interlayer carrying the adhesive composition;
(c) applying pressure against the outer surface of each of the substrate and glass sheet in at least a plane substantially normal to the planes of the substrate and sheet of glass proximate to, and parallel to, the side edge proximate which the adhesive was applied, to squeeze adhesive towards the side edge filling the gap between the substrate and sheet of glass between the position of the initial application of pressure to the substrate and glass sheet, and side edge, and away from the plane of pressure application on the side of the plane of pressure application, remote the side edge to form a continuous film of adhesive on the side of the plane of pressure application remote the side edge across the sheet of glass and substrate, between the sheets of glass and substrate, and thereafter, while continuing to apply pressure in the plane, moving the combination of the substrate and glass sheet relative to the plane of pressure in a direction towards the side edge through the plane in which the pressure is applied, ensuring that the edge of the film remote the plane of pressure application is always spaced from the plane until the sheets have passed through the plane of pressure application to uniformly spread adhesive between the substrate and sheet of glass as the combination is moved through the plane of the pressure application, and eliminate air bubbles; and
(d) thereafter, curing the liquid adhesive composition by irradiation.

34. In the process of claim 33, wherein the distribution of the adhesive on the substrate is in the form of at least a ribbon of liquid adhesive extending across the sheet and a plurality of ribbons extending substantially normal to the ribbon extending across the sheet in a direction away from the side edge.

35. In the process of claim 33, wherein the liquid adhesive composition distributed in the surface of one of the sheets comprises a plurality of ribbons of liquid adhesive spaced across the sheet, each ribbon extending along at least a portion of the length of the sheet.

36. In the process of claim 35, wherein each ribbon of adhesive extending along at least a portion of the length of the sheet has a greater amount of adhesive per unit length of ribbon in the form of a puddle proximate the end of the ribbon nearest the side edge.

37. In the process of claim 33, 34 or 35, wherein the substrate comprises clear, transparent PVC material.

38. In the process of claim 36, wherein the substrate comprises clear, transparent PVC material.

39. In a process for the manufacture of laminated glass comprising sheets of glass of predetermined length and width, a substrate or interlayer of predetermined length and width greater than the length and width of the glass sheets and a liquid radiation curable adhesive composition for bonding the glass sheets to the substrate or interlayer, the process comprising the steps of:
  (a) distributing the liquid adhesive composition on one surface of the substrate or interlayer at least proximate one side edge of the sheet across the sheet and along a portion of the length of the sheet;
  (b) applying a sheet of glass to the surface of the substrate or interlayer carrying the adhesive composition with the edges of the substrate extending beyond the side edges of the glass sheet;
  (c) applying pressure against the outer surfaces of each of the substrate and glass sheet in at least a plane substantially normal to the planes of the substrate and glass sheet towards the adhesive composition, proximate to and parallel to, the side edge of the substrate where the liquid adhesive composition has been applied to squeeze adhesive composition towards the side edge filling the gap between the glass sheet and substrate proximate the side edge and expressing liquid adhesive composition from between the substrate and glass sheet onto the substrate extending beyond the glass sheet, and away from the plane of pressure application on the side of the plane of pressure application remote the side edge, to form a continuous film of adhesive on the side of the plane of pressure application remote the side edge across the sheets of glass and substrate between the sheets of glass and substrate, and thereafter, while continuing to apply pressure in the plane normal to the plane of the glass sheet and substrate, moving the combination of the glass sheet and substrate relative to the plane of pressure in the direction towards the side edge through the plane in which the pressure was applied ensuring that the edge of the film remote the plane of pressure application is always spaced from the plane of pressure application until the sheets have passed through the plane of pressure application to uniformly spread adhesive between the substrate and sheet of glass as the combination is moved through the plane of pressure application, eliminate air bubbles and express adhesive onto the substrate; and
  (d) thereafter, curing the liquid adhesive composition by irradiation.

40. In the process of claim 39, wherein the distribution of the adhesive on the substrate is in the form of at least a ribbon of liquid adhesive extending across the sheet and a plurality of ribbons extending substantially normal to the ribbons extending across the sheet in a direction away from the side edge.

41. In the process of claim 39, wherein the liquid adhesive composition distributed on the surface of one of the sheets comprises a plurality of ribbons of liquid adhesive spaced across the sheet, each ribbon extending along at least a portion of the length of the sheet.

42. In the process of claim 41, wherein each ribbon of adhesive extending along at least a portion of the length of the sheet has a greater amount of adhesive per unit length of ribbon in the form of a puddle proximate the end of the ribbon nearest the side edge.

43. In the process of claim 39, 40 or 41, wherein the substrate comprises clear, transparent PVC material.

44. In the process of claim 42, wherein the substrate comprises, clear, transparent PVC material.

45. In the process of claim 33, wherein the substrate and glass sheet are disposed in a horizontal plane, the substrate is carried on a carrier and the glass sheet is placed on the top of the substrate.

46. In the process of claim 34, wherein the substrate and glass sheet are disposed in a horizontal plane, the substrate is carried on a carrier and the glass sheet is placed on the top of the substrate.

47. In the process of claim 35, wherein the substrate and glass sheet are disposed in a horizontal plane, the substrate is carried on a carrier and the glass sheet is placed on the top of the substrate.

48. In the process of claim 36, wherein the substrate and glass sheet are disposed in a horizontal plane, the substrate is carried on a carrier and the glass sheet is placed on the top of the substrate.

49. In the process of claim 39, wherein the substrate and glass sheet are disposed in a horizontal plane, the substrate is carried on a carrier and the glass sheet is placed on the top of the substrate.

50. In the process of claim 40, wherein the substrate and glass sheet are disposed in a horizontal plane, the substrate is carried on a carrier and the glass sheet is placed on the top of the substrate.

51. In the process of claim 41, wherein the substrate and glass sheet are disposed in a horizontal plane, the substrate is carried on a carrier and the glass sheet is placed on the top of the substrate.

52. In the process of claim 42, wherein the substrate and glass sheet are disposed in a horizontal plane, the substrate is carried on a carrier and the glass sheet is placed on the top of the substrate.

53. In the process of claim 45, 46 or 47, wherein after the irradiation of the adhesive film between the glass sheet and substrate, the combination is turned over and the process steps repeated with the application of a second sheet of glass on top of the substrate carrying adhesive applied with the bottom sheet of glass.

54. In the process of claim 48, wherein after the irradiation of the adhesive film between the glass sheet and substrate, the combination is turned over and the process steps repeated with the application of a second sheet of glass on top of the substrate carrying adhesive aligned with the bottom sheet of glass.

55. In the process of claim 49, wherein after the irradiation of the adhesive film between the glass sheet and substrate, the combination is turned over and the process steps repeated with the application of a second sheet of glass on top of the substrate carrying adhesive aligned with the bottom sheet of glass.

56. In the process of claim 50, wherein after the irradiation of the adhesive film between the glass sheet and substrate, the combination is turned over and the process steps repeated with the application of a second sheet of glass on top of the substrate carrying adhesive aligned with the bottom sheet of glass.

57. In the process of claim 51, wherein after the irradiation of the adhesive film between the glass sheet and substrate, the combination is turned over and the process steps repeated with the application of a second sheet of glass on top of the substrate carrying adhesive aligned with the bottom sheet of glass.

58. In the process of claim 52 wherein after the irradiation of the adhesive film between the glass sheet and substrate, the combination is turned over and the process steps repeated with the application of a second sheet of glass on top of the substrate carrying adhesive aligned with the bottom sheet of glass.

59. In the process of claim 49 or 50, wherein after the second irradiation with both glass sheets now secured to the oversized substrate, the substrate is trimmed and finished.

60. In the process of claim 51 or 52, wherein after the second irradiation with both glass sheets now secured to the oversized substrate, the substrate is trimmed and finished.

61. In the process of claim 33, 34 or 35, wherein the pressure may be applied by spaced rollers applied to the surface of the glass remote from the substrate and the surface of the substrate remote from the glass.

62. In the process of claim 36, 39 or 40, wherein the pressure may be applied to the surface of the glass remote from the substrate and the surface of the substrate remote from the glass, by spaced rollers.

63. In the process of claim 41, 42 or 45, wherein the pressure may be applied to the surface of the glass remote from the substrate and the surface of the substrate remote from the glass, by spaced rollers.

64. In the process of claim 46, 47 or 48, wherein the pressure may be applied by spaced rollers to the surface of the glass remote from the substrate and the surface of the substrate remote from the glass.

65. In the process of claim 49, 50 or 51, wherein the pressure may be applied to the surface of the glass remote from the substrate and the surface of the substrate remote from the glass, by spaced rollers.

66. In the process of claim 52, 54 or 55, wherein the pressure may be applied to the surface of the glass remote from the substrate and the surface of the substrate remote from the glass, by spaced rollers.

67. A process for the manufacture of laminated glass comprising sheets of glass, a substrate or interlayer and a radiation curable adhesive composition for bonding the glass sheets to the substrate or interlayer comprises the steps of:
 (a) distributing the liquid adhesive composition on one of the surfaces of each of two sheets of glass proximate a side edge of each, applying substrate or interlayer material on one of the sheets of glass and sandwiching the substrate between the sheets of glass with the side edges proximate which the adhesive was applied, aligned with one another;
 (b) applying pressure against the surfaces of the glass sheets remote the interlayer substantially normal to the planes of the glass sheets, proximate to, and parallel to, the side edges proximate which the adhesive was applied, to force adhesive, towards the side edge filling the gap between the substrate and glass sheets between the position of the initial application of pressure and side edges and, to the side of the position of the pressure application remote the side edges to form continuous films of adhesive on the side of the position of pressure application remote the side edges and extending across the sheets between the sheets, and thereafter, while continuing to apply the pressure at the position, moving the combination of the substrate and glass sheets through the position of pressure application ensuring that the edge of each of the films remote the position of pressure application is always spaced from the position of pressure application until the sheets have entirely passed the position of pressure application to uniformly spread the adhesive between the substrate and sheets of glass and eliminate air bubbles; and
 (d) thereafter, curing the liquid adhesive composition by irradiation.

68. In the process of claim 67, wherein the glass sheets are placed side by side in a horizontal plane with each sheet having an inner edge closer the other sheet, and an outer edge, the liquid adhesive is applied to the top surface of each sheet proximate the outer side edge, the substrate is applied to one of the sheets of glass, and the glass sheets are pivoted about their inner edges in a vertical direction for sandwiching the substrate between the glass sheets.

69. In the process of claim 68, wherein the combination is fed vertically through a series of pressure rollers oriented with their axes extending horizontally.

70. In the process of claim 68, wherein the combination is fed horizontally through a series of pressure rollers with their axes oriented in the vertical direction.

71. In the process of claim 67, wherein the distribution of the adhesive on the substrate is in the form of at least a ribbon of liquid adhesive extending across the sheet and a plurality of ribbons extending substantially normal to the ribbons extending across the sheet in a direction away from the side edge.

72. In the process of claim 70, wherein the distribution of the adhesive on the substrate is in the form of at least a ribbon of liquid adhesive extending across the sheet and a plurality of ribbons extending substantially normal to the ribbons extending across the sheet in a direction away from the side edge.

73. In the process of claim 67, wherein liquid adhesive composition distributed on the surface of one of the sheets comprises a plurality of ribbons of liquid adhesive spaced across the sheet, each ribbon extending along at least a portion of the length of the sheet.

74. In the process of claim 68, wherein liquid adhesive composition distributed on the surface of one of the sheets comprises a plurality of ribbons of liquid adhesive spaced across the sheet, each ribbon extending along at least a portion of the length of the sheet.

75. In the process of claim 69, wherein liquid adhesive composition distributed on the surface of one of the sheets comprises a plurality of ribbons of liquid adhesive spaced across the sheet, each ribbon extending along at least a portion of the length of the sheet.

76. In the process of claim 70, wherein liquid adhesive composition distributed on the surface of one of the sheets comprises a plurality of ribbons of liquid adhesive spaced across the sheet, each ribbon extending along at least a portion of the length of the sheet.

77. In the process of claims 73, 74 or 75, wherein each ribbon of adhesive extending along at least a portion of the length of the sheet has a greater amount of adhesive per unit length of ribbon in the form of a puddle proximate the end of the ribbon nearest the side edge.

78. In the process of claim 76, wherein each ribbon of adhesive extending along at least a portion of the length of the sheet has a greater amount of adhesive per unit length of ribbon in the form of a puddle proximate the end of the ribbon nearest the side edge.

79. The process of claim 1, 2 or 3, wherein the radiation curable adhesive composition is photopolymerisable.

80. The process of claim 4, 5 or 6 wherein the radiation curable adhesive is photopolymerisable.

81. The process of claim 7, 8, or 9, wherein the radiation curable adhesive composition is photopolymerisable.

82. The process of claim 10, 15 or 16 wherein the radiation curable adhesive composition is photopolymerisable.

83. The process of claim 17, 18 or 19, wherein the radiation curable adhesive composition is photopolymerisable.

84. The process of claim 20, 21, or 22, wherein the radiation curable adhesive composition is photopolymerisable.

85. The process of claim 23, 24 or 29, wherein the radiation curable adhesive composition is photopolymerisable.

86. The process of claim 30, 31 or 32, wherein the radiation curable adhesive composition is photopolymerisable.

87. The process of claim 33, 34 or 35, wherein the radiation curable adhesive composition is photopolymerisable.

88. The process of claim 36, 38 or 39, wherein the radiation curable adhesive composition is photopolymerisable.

89. The process of claim 40, 41 or 42, wherein the radiation curable adhesive composition is photopolymerisable.

90. The process of claim 44, 45 or 46, wherein the radiation curable adhesive composition is photopolymerisable.

91. The process of claim 47, 48 or 49, wherein the radiation curable adhesive composition is photopolymerisable.

92. The process of claim 50, 51 or 52, wherein the radiation curable adhesive composition is photopolymerisable.

93. The process of claim 54, 55 or 56, wherein the radiation curable adhesive composition is photopolymerisable.

94. The process of claim 57, 58 or 67, wherein the radiation curable adhesive composition is photopolymerisable.

95. The process of claim 68, 69 or 70, wherein the radiation curable adhesive composition is photopolymerisable.

96. The process of claim 71, 72 or 73 wherein the radiation curable adhesive composition is photopolymerisable.

97. The process of claim 74, 75 or 76, wherein the radiation curable adhesive composition is photopolymerisable.

98. The process of claim 78 wherein the radiation curable adhesive composition is photopolymerisable.

99. In a process for the joining of two sheets of material together, one of which sheets being transparent, the process comprising the steps of:
  (a) distributing liquid radiation curable adhesive composition on one surface of one of the sheets at least proximate one side edge across the sheet and preferably along a portion of the length of the sheet;
  (b) applying the other sheet to the adhesive covered sheet;
  (c) applying pressure against each of the sheets in at least a plane of pressure normal to the planes of the sheets, the plane of pressure being incorporated in an application of pressure directed generally normal to the plane of the sheets over a narrow elongate zone extending generally parallel to, and proximate the side edge, to squeeze adhesive towards the side edge filling any gap between the sheets between the position of initial pressure application and the side edge, and away from the zone of pressure application on the side of the zone of pressure application remote the side edge to form a continuous film of adhesive on the side of the zone of pressure remote the side edge across the sheets between the sheets, and thereafter, while continuing to apply pressure, moving the zone of pressure relative to the sheets away from the side edge or moving the sheets relative to the zone of pressure in the direction towards the side edge ensuring that the edge of the film remote the zone of pressure is always spaced from the zone of pressure until the sheets have passed through or been passed through the zone of pressure, to uniformly spread the adhesive between the sheets and eliminate air bubbles; and
  (d) thereafter, curing the liquid adhesive composition by irradiation.

100. In the process of claim 99, wherein the two sheets of material comprise glass and/or plastics material.

101. In the process of claim 99, wherein the two sheets of material comprises two sheets of glass.

102. In the process of claim 99, wherein the two sheets of material comprises one glass sheet of material and the other a transparent substrate or interlayer plastics material.

103. In the process of claim 102, wherein the plastics material comprises PVC, PVB or polyurethane material.

104. In the process of claim 99, wherein the liquid adhesive composition distributed on the surface of one of the sheets comprises a plurality of ribbons of liquid adhesive spaced across the sheet, each ribbon extending along at least a portion of the length of the sheet.

105. In the process of claim 100, wherein the liquid adhesive composition distributed on the surface of one of the sheets comprises a plurality of ribbons of liquid adhesive spaced across the sheet, each ribbon extending along at least a portion of the length of the sheet.

106. In the process of claim 101, wherein the liquid adhesive composition distributed on the surface of one of the sheets comprises a plurality of ribbons of liquid adhesive spaced across the sheet, each ribbon extending along at least a portion of the length of the sheet.

107. In the process of claim 102, wherein the liquid adhesive composition distributed on the surface of one of the sheets comprises a plurality of ribbons of liquid adhesive spaced across the sheet, each ribbon extending along at least a portion of the length of the sheet.

108. In the process of claim 103, wherein the liquid adhesive composition distributed on the surface of one of the sheets comprises a plurality of ribbons of liquid adhesive spaced across the sheet, each ribbon extending along at least a portion of the length of the sheet.

109. In the process of claim 99, 100 or 101, or 8 wherein each ribbon of adhesive extending along at least a portion of the length of the sheet has a greater amount of adhesive per unit length of ribbon in the form of a puddle proximate the end of the ribbon nearest the side edge.

110. In the process of claim 102 or 103, or 10, wherein each ribbon of adhesive extending along a least a portion of the length of the sheet has a greater amount of adhesive per unit length of ribbon in the form of a puddle proximate the end of the ribbon nearest the side edge.

111. In the process of claim 99, 100 or 101, or 3, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

112. In the process of claim 102 or 103, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

113. In a process for the joining of two sheets of material together, one of which being transparent, the process comprising the steps of:
  (a) distributing liquid radiation curable adhesive composition on one surface of one of the sheets at least proximate one side edge across the sheet and along a portion of the length of the sheet;
  (b) applying the other sheet to the adhesive covered sheet;
  (c) applying pressure against each of the sheets in at least a plane of pressure normal to the planes of the sheets, the plane of pressure being incorporated in an application of pressure directed generally normal to the plane of the sheets over a narrow elongate zone extending generally parallel to, and proximate the side edge, to squeeze adhesive towards the side edge filling any gap between the sheets between the position of initial pressure application and the side edge, and away from the zone of pressure application on the side of the zone of pressure application remote the side edge to form a continuous film of adhesive on the side of the zone of pressure remote the side edge, across the sheets between the sheets, and thereafter, while continuing to apply pressure in the zone, moving the sheets relative to the zone of pressure in the direction towards the side edge ensuring that the edge of the film remote the zone of pressure is always spaced from the zone of pressure until the sheets have passed through the zone of pressure, to uniformly spread the adhesive between the sheets, and eliminate air bubbles; and
  (d) thereafter, curing the liquid adhesive composition by irradiation.

114. In the process of claim 113, wherein the two sheets of material comprise glass and/or plastics material.

115. In the process of claim 113, wherein the two sheets of material comprises two sheets of glass.

116. In the process of claim 113, wherein the two sheets of material comprises one glass sheet of material and the other a transparent substrate or interlayer plastics material.

117. In the process of claim 116, wherein the plastics material comprises PVC, PVB or polyurethane material.

118. In the process of claim 113, wherein the liquid adhesive composition distributed on the surface of one of the sheets comprises a plurality of ribbons of liquid adhesive spaced across the sheet, each ribbon extending along at least a portion of the length of the sheet.

119. In the process of claim 114, wherein the liquid adhesive composition distributed on the surface of one of the sheets comprises a plurality of ribbons of liquid adhesive spaced across the sheet, each ribbon extending along at least a portion of the length of the sheet.

120. In the process of claim 115, wherein the liquid adhesive composition distributed on the surface of one of the sheets comprises a plurality of ribbons of liquid adhesive spaced across the sheet, each ribbon extending along at least a portion of the length of the sheet.

121. In the process of claim 116, wherein the liquid adhesive composition distributed on the surface of one of the sheets comprises a plurality of ribbons of liquid adhesive spaced across the sheet, each ribbon extending along at least a portion of the length of the sheet.

122. In the process of claim 117, wherein the liquid adhesive composition distributed on the surface of one of the sheets comprises a plurality of ribbons of liquid adhesive spaced across the sheet, each ribbon extending along at least a portion of the length of the sheet.

123. In the process of claim 113, 114 or 115, wherein each ribbon of adhesive extending along at least a portion of the length of the sheet has a greater amount of adhesive per unit length of ribbon in the form of a puddle proximate the end of the ribbon nearest the side edge.

124. In the process of claim 116 or 117, wherein each ribbon of adhesive extending along a least a portion of the length of the sheet has a greater amount of adhesive per unit length of ribbon in the form of a puddle proximate the end of the ribbon nearest the side edge.

125. In the process of claim 113, 114, or 115, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

126. In the process of claim 116 or 117, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

127. In a process for the manufacture of laminated glass comprising sheets of glass and a liquid radiation curable adhesive composition for bonding the glass, the process comprising the steps of:

(a) distributing the liquid adhesive composition on one surface of one sheet of glass at least proximate one side edge across the sheet and along a portion of the length of the sheet;

(b) applying the other sheet of glass to the adhesive covered sheet of glass;

(c) applying pressure against each of the sheets in at least a plane of pressure normal to the planes of the sheets, the plane of pressure being incorporated in an application of pressure directed generally normal to the plane of the sheets over a narrow elongate zone extending generally parallel to and proximate the side edge, to squeeze adhesive, towards the side edge filling any gap between the sheets of glass between the position of initial pressure application and the side edge, and away from the zone of pressure application on the side of the zone of pressure application remote the side edge to form a continuous film of adhesive on the side of the zone of pressure remote the side edge, across the sheet of glass, between the sheets of glass, and thereafter, while continuing to apply pressure in the zone, moving the sheets of glass relative to the zone of pressure in the direction towards the side edge ensuring that the edge of the film remote the zone of pressure is always spaced from the zone of pressure until the sheets have passed through the zone of pressure to uniformly spread the adhesive between the sheets and eliminate air bubbles; and (d) thereafter, curing the liquid adhesive composition by irradiation.

128. In the process of claim 127, wherein the liquid adhesive composition distributed on the surface of one of the sheets comprises a plurality of ribbons of liquid adhesive spaced across the sheet, each ribbon extending along at least a portion of the length of the sheet.

129. In the process of claim 128, wherein each ribbon of adhesive extending along at least a portion of the length of the sheet has a greater amount of adhesive per unit length of ribbon in the form of a puddle proximate the end of the ribbon nearest the side edge.

130. In the process of claim 127, wherein the liquid adhesive composition distributed on the surface of one of the sheets comprises a ribbon of adhesive extending across the sheet proximate the side edge and a plurality of ribbons extending normal to the ribbon extending across the sheet in a direction away from the side edge at least for a portion of the length of the sheet of glass.

131. In a process for the manufacture of laminated glass comprising sheets of glass, a substrate or interlayer and a liquid radiation curable adhesive composition for bonding the glass sheets to the substrate or interlayer, the process comprising the steps of:

(a) distributing the liquid adhesive composition on one surface of the substrate or interlayer at least proximate one side edge of the sheets, across the sheet and along a portion of the length of the sheet;

(b) applying a sheet of glass to the surface of the substrate or interlayer carrying the adhesive composition;

(c) applying pressure against each of the sheets in at least a plane of pressure normal to the planes of the sheets, the plane of pressure being incorporated in an application of pressure directed generally normal to the plane of the sheets over a narrow elongate zone extending generally parallel to and proximate the side edge, to squeeze adhesive towards the side edge filling the gap between the substrate and sheet of glass between the position of the initial application of pressure to the substrate and glass sheet, and side edge, and away from the plane of pressure application on the side of the plane of pressure application, remote the side edge to form a continuous film of adhesive on the side of the plane of pressure application remote the side edge across the sheet of glass and substrate, between the sheets of glass and substrate, and thereafter, while continuing to apply pressure in the plane, moving the combination of the substrate and glass sheet relative to the plane of pressure in a direction towards the side edge through the plane in which the pressure is applied, ensuring that the edge of the film remote the plane of pressure application is alway spaced from the plane until the sheets have passed through the plane of pressure application to uniformly spread adhesive between the substrate and sheet of glass as the combination is moved through the plane of the pressure application, and eliminate air bubbles; and (d) thereafter, curing the liquid adhesive composition by irradiation.

132. In the process of claim 131, wherein the distribution of the adhesive on the substrate is in the form of at least a ribbon of liquid adhesive extending across the sheet and a plurality of ribbons extending substantially normal to the ribbon extending across the sheet in a direction away from the side edge.

133. In the process of claim 131, wherein the liquid adhesive composition distributed on the surface of one of the sheets comprises a plurality of ribbons of liquid adhesive spaced across the sheet, each ribbon extending along at least a portion of the length of the sheet.

134. In the process of claim 133, wherein each ribbon of adhesive extending along at least a portion of the length of the sheet has a greater amount of adhesive per unit length of ribbon in the form of a puddle proximate the end of the ribbon nearest the side edge.

135. In the process of claim 131, 132 or 133, wherein the substrate comprises clear, transparent PVC material.

136. In the process of claim 134, wherein the substrate comprises clear, transparent PVC material.

137. In a process for the manufacture of laminated glass comprising sheets of glass of predetermined length and width, a substrate or interlayer of predetermined length and width greater than the length and width of the glass sheets and a liquid radiation curable adhesive composition for bonding the glass sheets to the substrate or interlayer, the process comprising the steps of:

(a) distributing the liquid adhesive composition on one surface of the substrate or interlayer at least proximate one side edge of the sheet across the sheet and along a portion of the length of the sheet.

(b) applying a sheet of glass to the surface of the substrate or interlayer carrying the adhesive composition with the edges of the substrate extending beyond the side edges of the glass sheet;

(c) applying pressure against the outer surfaces of each of the substrate and glass sheet in at least a plane of pressure normal to the planes of the substrate and glass sheet towards the adhesive composition, the plane of pressure being incorporated in an application of pressure directed generally normal to the plane of the substrate and glass sheet over a narrow elongate zone extending generally parallel to, and proximate to the side edges of the substrate where the liquid adhesive composition has been applied to squeeze adhesive towards the side edge filling the gap between the glass sheet and substrate proximate the side edge and expressing liquid adhesive composition from between the substrate and glass sheet onto the substrate extending beyond the glass sheet, and away from the plane of pressure application on the side of the plane of pressure application remote the side edge, to form a continuous film of adhesive on the side of the plane of pressure application remote the side edge across the sheets of glass and substrate between the sheets of glass and substrate, and thereafter, while continuing to apply pressure in the plane normal to the plane of the glass sheet and substrate, moving the combination of the glass sheet and substrate relative to the plane of pressure in the direction towards the side edge through the plane in which the pressure was applied ensuring that the edge of the film remote the plane of pressure application is always spaced from the plane of pressure application until the sheets have passed through the plane of pressure application to uniformly spread adhesive between the substrate and sheet of glass as the combination is moved through the plane of pressure application, eliminate air bubbles and express adhesive onto the substrate; and (d) thereafter, curing the liquid adhesive composition by irradiation.

138. In the process of claim 137, wherein the distribution of the adhesive on the substrate is in the form of at least a ribbon of liquid adhesive extending across the sheet and a plurality of ribbons extending substantially normal to the ribbons extending across the sheet in a direction away from the side edge.

139. In the process of claim 137, wherein the liquid adhesive composition distributed on the surface of one of the sheets comprises a plurality of ribbons of liquid adhesive spaced across the sheet, each ribbon extending along at least a portion of the length of the sheet.

140. In the process of claim 139, wherein each ribbon of adhesive extending along at least a portion of the length of the sheet has a greater amount of adhesive per unit length of ribbon in the form of a puddle proximate the end of the ribbon nearest the side edge.

141. In the process of claim 137, 138 or 139, wherein the substrate comprises clear, transparent PVC material.

142. In the process of claim 140, wherein the substrate comprises, clear, transparent PVC material.

143. In the process of claim 131, wherein the substrate and glass sheet are disposed in a horizontal plane, the substrate is carried on a carrier and the glass sheet is placed on the top of the substrate.

144. In the pocess of claim 132, wherein the substrate and glass sheet are disposed in a horizontal plane, the substrate is carried on a carrier and the glass sheet is placed on the top of the substrate.

145. In the process of claim 133, wherein the substrate and glass sheet are disposed in a horizontal plane, the substrate is carried on a carrier and the glass sheet is placed on the top of the substrate.

146. In the process of claim 134, wherein the substrate and glass sheet are disposed in a horizontal plane, the substrate is carried on a carrier and the glass sheet is placed on the top of the substrate.

147. In the process of claim 137, wherein the substrate and glass sheet are disposed in a horizontal plane, the substrate is carried on a carrier and the glass sheet is placed on the top of the substrate.

148. In the process of claim 138, wherein the substrate and glass sheet are disposed in a horizontal plane, the substrate is carried on a carrier and the glass sheet is placed on the top of the substrate.

149. In the process of claim 139, wherein the substrate and glass sheet are disposed in a horizontal plane, the substrate is carried on a carrier and the glass sheet is placed on the top of the substrate.

150. In the process of claim 140, wherein the substrate and glass sheet are disposed in a horizontal plane, the substrate is carried on a carrier and the glass sheet is placed on the top of the substrate.

151. In the process of claim 143, 144, or 145, wherein after the irradiation of the adhesive film between the glass sheet and substrate, the combination is turned over and the process steps repeated with the application of a second sheet of glass on top of the substrate carrying adhesive applied with the bottom sheet of glass.

152. In the process of claim 146, wherein after the irradiation of the adhesive film between the glass sheet and substrate, the combination is turned over and the process steps repeated with the application of a second sheet of glass on top of the substrate carrying adhesive aligned with the bottom sheet of glass.

153. In the process of claim 147, wherein after the irradiation of the adhesive film between the glass sheet and substrate, the combination is turned over and the process steps repeated with the application of a second sheet of glass on top of the substrate carrying adhesive aligned with the bottom sheet of glass.

154. In the process of claim 148, wherein after the irradiation of the adhesive film between the glass sheet and substrate, the combination is turned over and the process steps repeated with the application of a second sheet of glass on top of the substrate carrying adhesive aligned with the bottom sheet of glass.

155. In the process of claim 149, wherein after the irradiation of the adhesive film between the glass sheet and substrate, the combination is turned over and the process steps repeated with the application of a second sheet of glass on top of the substrate carrying adhesive aligned with the bottom sheet of glass.

156. In the process of claim 150, wherein after the irradiation of the adhesive film between the glass sheet and substrate, the combination is turned over and the process steps repeated with the application of a second sheet of glass on top of the substrate carrying adhesive aligned with the bottom sheet of glass.

157. In the process of claim 147 or 148, wherein after the second irradiation with both glass sheets now secured to the oversized substrate, the substrate is trimmed and finished.

158. In the process of claim 149 or 150, wherein after the second irradiation with both glass sheets now secured to the oversized substrate, the substrate is trimmed and finished.

159. In the process of claim 131, 132, or 133, wherein the pressure may be applied by spaced rollers applied, to the surface of the glass remote from the substrate and the surface of the substrate remote from the glass.

160. In the process of claim 134, 137, or 138, wherein the pressure may be applied to the surface of the glass remote from the substrate and the surface of the substrate remote from the glass, by spaced rollers.

161. In the process of claim 139, 140 or 143, wherein the pressure may be applied to the surface of the glass remote from the substrate and the surface of the substrate remote from the glass, by spaced rollers.

162. In the process of claim 144, 145, or 146, wherein the pressure may be applied by spaced rollers to the surface of the glass remote from the substrate and the surface of the substrate remote from the glass.

163. In the process of claim 147, 148 or 149, wherein the pressure may be applied to the surface of the glass remote from the substrate and the surface of the substrate remote from the glass, by spaced rollers.

164. In the process of claim 150, 152 or 153, wherein the pressure may be applied to the surface of the glass remote from the substrate and the surface of the substrate remote from the glass, by spaced rollers.

165. The process of claim 99, 100 or 101, wherein the radiation curable adhesive composition is photopolymerisable.

166. The process of claim 102, 103 or 104, wherein the radiation curable adhesive composition is photopolymerisable.

167. The process of claim 105, 106, or 107 wherein the radiation curable adhesive composition is photopolymerisable.

168. The process of claim 108, 113 or 114, wherein the radiation curable adhesive composition is photopolymerisable.

169. The process of claim 115, 116 or 117, wherein the radiation curable adhesive composition is photopolymerisable.

170. The process of claim 118, 119, or 120, wherein the radiation curable adhesive composition is photopolymerisable.

171. The process of claim 121, 122, or 127, wherein the radiation curable adhesive composition is photopolymerisable.

172. The process of claim 128, 129 or 130, wherein the radiation curable adhesive composition is photopolymerisable.

173. The process of claims 131, 132, or 133, wherein the radiation curable adhesive composition is photopolymerisable.

174. The process of claim 134, 135 or 136, wherein the radiation curable adhesive composition is photopolymerisable.

175. The process of claim 137, 138, or 139, wherein the radiation curable adhesive composition is photopolymerisable.

176. The process of claim 140, 141 or 142, wherein the radiation curable adhesive composition is photopolymerisable.

177. The process of claim 143, 144, or 145 wherein the radiation curable adhesive composition is photopolymerisable.

178. The process of claim 146, 147 or 148, wherein the radiation curable adhesive composition is photopolymerisable.

179. The process of claim 152, 153, or 154, wherein the radiation curable adhesive composition is photopolymerisable.

180. The process of claim 155 or 156 wherein the radiation curable adhesive composition is photopolymerisable.

* * * * *